United States Patent
West et al.

(10) Patent No.: US 11,537,204 B1
(45) Date of Patent: Dec. 27, 2022

(54) PASSIVE AND ACTIVE GROUNDING TECHNIQUES FOR HAPTIC DEVICES

(71) Applicant: META PLATFORMS TECHNOLOGIES, LLC, Menlo Park, CA (US)

(72) Inventors: Zachary Daniel West, Seattle, WA (US); Aaron Alan Ambuske, Seattle, WA (US); Nicholas Roy Corson, Woodinville, WA (US); Brian Cox, Seattle, WA (US); Amirhossein Hajiagha Memar, Redmond, WA (US); David Rother Dobbs, Bothell, WA (US); Priyanshu Agarwal, Sunnvvale, CA (US); Nicholas Colonnese, Kirkland, WA (US); John Dietrich Martin, Seattle, WA (US); Ana Mirona Motoc, Seattle, WA (US); Brian Fletcher, Issaquah, WA (US); Jay Barrett Willet, Tacoma, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/065,129

(22) Filed: Oct. 7, 2020

Related U.S. Application Data

(60) Provisional application No. 62/911,610, filed on Oct. 7, 2019.

(51) Int. Cl.
*G06F 3/01* (2006.01)
*G02B 27/01* (2006.01)

(52) U.S. Cl.
CPC .......... *G06F 3/014* (2013.01); *G02B 27/017* (2013.01); *G06F 3/016* (2013.01)

(58) Field of Classification Search
CPC ........ G06F 3/014; G06F 3/016; G02B 27/017
See application file for complete search history.

(56) References Cited

U.S. PATENT DOCUMENTS

| | | | |
|---|---|---|---|
| 10,642,356 B1 | 5/2020 | Wang et al. | |
| 2008/0167662 A1* | 7/2008 | Kurtz | A61B 34/30 606/130 |
| 2014/0215684 A1* | 8/2014 | Hardy | A41D 19/0031 2/160 |
| 2014/0226225 A1* | 8/2014 | Suess | G02B 7/002 359/879 |
| 2015/0341068 A1* | 11/2015 | Singhal | G06F 1/163 455/575.6 |
| 2016/0363997 A1* | 12/2016 | Black | G06F 3/016 |
| 2021/0096649 A1* | 4/2021 | Mok | G06F 3/01 |

* cited by examiner

*Primary Examiner* — Towfiq Elahi
(74) *Attorney, Agent, or Firm* — Morgan, Lewis & Bockius LLP

(57) ABSTRACT

An apparatus for fixing a wearable structure and/or a user-feedback element to a user is provided. The apparatus includes a wearable structure configured to be worn by a user, and a grounding assembly, coupled to the wearable structure. The grounding assembly includes: (i) an inflatable bladder, coupled to a first portion of the wearable structure, and (ii) a cord, coupled to a second portion of the wearable structure and the inflatable bladder. The inflatable bladder is configured to receive a fluid from a source. The cord is configured to tighten around a portion of the user's body according to and in proportion with the fluid pressure inside the inflatable bladder.

11 Claims, 25 Drawing Sheets

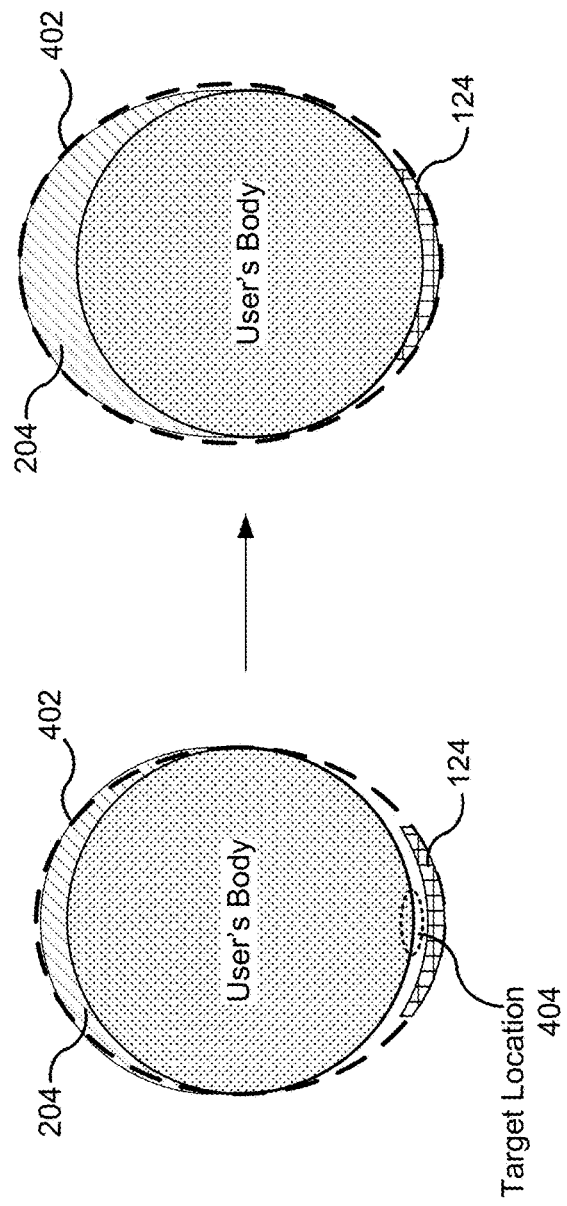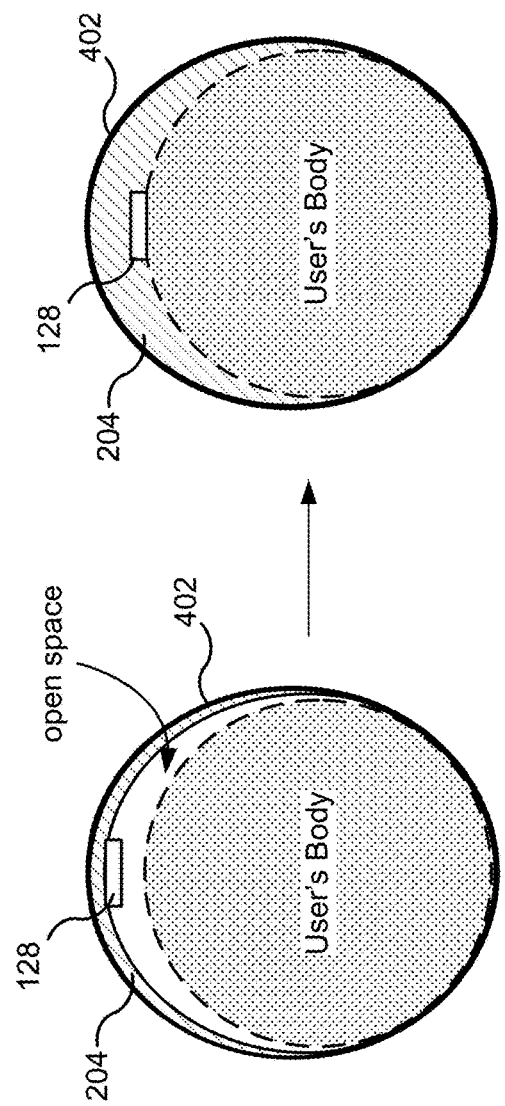

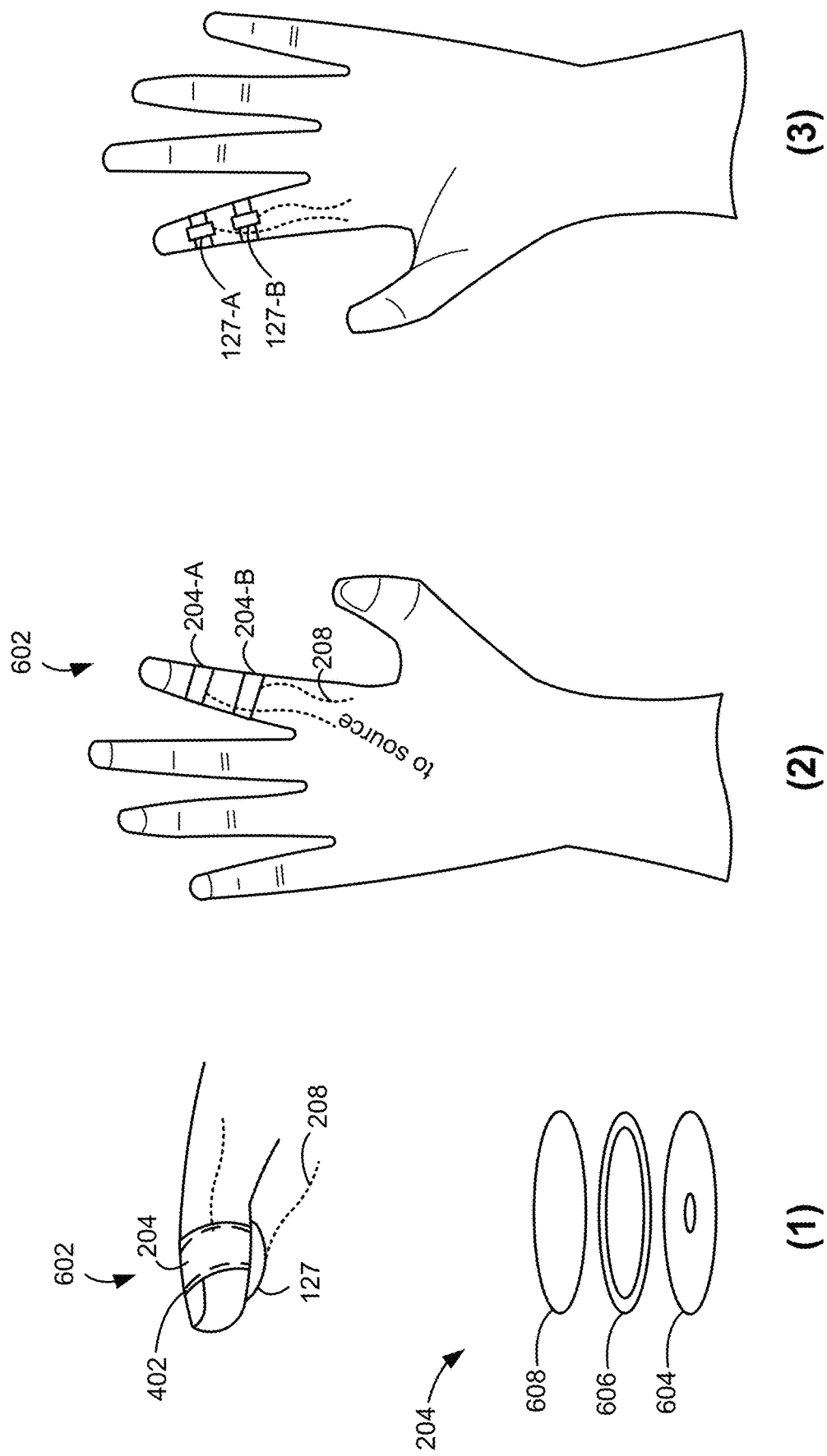

PASSIVE AND ACTIVE GROUNDING TECHNIQUES FOR HAPTIC DEVICES

RELATED APPLICATIONS

This application claims priority to U.S. Provisional Patent Application No. 62/911,610, filed Oct. 7, 2019, entitled "Passive and Active Grounding Techniques for Haptic Devices," which is hereby incorporated by reference in its entirety

TECHNICAL FIELD

This application relates generally to artificial-reality devices, including techniques for grounding those devices to a user.

BACKGROUND

Artificial-reality devices (e.g., virtual-reality devices, augmented-reality devices, etc.) have wide applications in various fields, including engineering design, medical surgery practice, military simulated practice, and video gaming. Haptic or kinesthetic stimulations recreate the sense of touch by applying forces, vibrations, and/or motions to a user, and are frequently implemented with artificial-reality devices in the form of a wearable device (sometimes referred to as a "haptic display").

Performance of these wearable devices with haptic-creating mechanisms is closely related to how well these mechanisms are attached to a user's body during operation, and how reliably they transfer forces to the user's body. "Grounding" refers to the part of wearable devices responsible for transferring the forces from a haptic-creating mechanism to the user's body. Careful grounding design is critical for a wearable device's performance and, in turn, a user's experience with the artificial-reality device as a whole.

However, existing wearable devices do not implement adequate grounding mechanisms. At present, most designers have focused their efforts on basic passive grounding techniques, such as where a Velcro strap is used to secure the haptic-creating mechanisms (and the wearable device generally) to the user's hand. This approach results in a cumbersome grounding solution where each strap requires large pretension to adequately secure a haptic-creating mechanisms to the user's body. Due to the design and nature of the straps, this approach also restricts blood flow, making these devices uncomfortable. Furthermore, donning and doffing a wearable device with these types of straps is labor intensive, as each strap has to be physically undone and reattached between uses, which makes the entire artificial-reality experience sub-optimal.

SUMMARY

Accordingly, there is a need for devices and systems that can be used to ground wearable devices (and their associated components, such as haptic-creating mechanisms) to a user's body. One solution is a wearable device that implements active grounding techniques. Active grounding refers to a grounding assembly that actuates some mechanism or device to effectuate grounding. One example of active grounding involves bladders that can be inflated or deflated to attach or detach a wearable device to a user's body. Active grounding devices can be computer controlled, meaning that said devices can be controlled to provide optimal grounding forces and fit to a particular user (as body size will change from user to user). Thus, active grounding provides a much more ergonomic and optimal user experience. Furthermore, active grounding can reduce the donning and doffing time of the wearable device considerably as the inflatable bladders can be deflated quickly, meaning that the wearable device can be attached to and detached from the user's body with ease.

(A1) In some embodiments, the solution explained above can be implemented on a wearable device that includes (i) a wearable structure to be worn by a user of the wearable device, (ii) a user-feedback element, coupled to the wearable structure, configured to interact with a target location on the user's body, and (iii) a grounding assembly, coupled to the wearable structure, that includes an inflatable bladder that is shaped to fit, at least partially, around a portion of the user's body. Furthermore, the inflatable bladder is configured to expand when inflated, which causes one or more of: (i) the wearable structure to tighten around the portion of the user's body, and (ii) the user-feedback element to be positioned in a predefined manner, relative to the user's body, at the target location.

(A2) In some embodiments of A1, the inflatable bladder is configured to: (i) expand a first amount when inflated to a first pressure, said expansion of the inflatable bladder by the first amount causes the wearable structure to tighten around the portion of the user's body, and (ii) expand a second amount when inflated to a second pressure greater than the first pressure, said expansion of the inflatable bladder by the second amount, which is greater than the first amount, causes: (a) the wearable structure to further tighten around the portion of the user's body, and (b) the user-feedback element to be positioned in the predefined manner, relative to the user's body, at the target location.

(A3) In some embodiments of any of A1-A2, the inflatable bladder includes multiple zones. Furthermore, a pressure inside each respective zone of the multiple zones is independently controlled according to a known impedance (e.g., a body-tissue impedance) of the portion of the user's body.

(A4) In some embodiments of any of A1-A3, the grounding assembly further comprises a sensor to measure one or more impedances of the user's body (e.g., the known impedance from A3). In some embodiments, the sensor is the user-feedback element and, is thus, not part of the grounding assembly.

(A5) In some embodiments of any of A1-A4, the wearable structure includes an inner surface and an outer surface, whereby the inner surface is in direct contact with the user's body. Furthermore, the grounding assembly is coupled to the outer surface of the wearable structure. In those embodiments where the grounding assembly is coupled to the outer surface of the wearable structure, the grounding assembly further includes an inextensible material that wraps around the portion of the user's body, such that expansion of the inflatable bladder pushes against, on one side, the inextensible material, and on the other side, the outer surface of the wearable structure and, in turn, the portion of the user's body.

(A6) In some embodiments of any of A1-A5, when the inflatable bladder is inflated to a first pressure, the grounding assembly has a first internal volume. Further, when the inflatable bladder is inflated to a second pressure less than the first pressure, the grounding assembly has a second internal volume that is greater than the first internal volume. In other words, an internal volume of the grounding assembly is inversely related to a pressure inside the inflatable bladder. The portion of the user's body occupies the internal volume of the grounding assembly.

(A7) In some embodiments of any of A1-A6, when the inflatable bladder is inflated, the inflatable bladder is configured to expand toward the portion of the user's body in one or more directions (e.g., circumferentially, longitudinally, along a bias/angle).

(A8) In some embodiments of any of A1-A7, the grounding assembly is also coupled to the user-feedback element.

(A9) In some embodiments of any of A1-A8, the user-feedback element is a sensor or an actuator.

(A10) In some embodiments of any of A1-A9, the portion of the user's body includes one or more joints and the inflatable bladder has a predefined shape. Also, the predefined shape of the inflatable bladder is shaped to not encumber the one or more joints of the portion of the user's body.

(A11) In some embodiments of any of A1-A10, the inflatable bladder is a laser-welded webbing structure, and the laser-welded webbing structure is shaped to accommodate movement of joints of the user.

(A12) In some embodiments of A11, the inflatable bladder includes opposing first and second sides, whereby (i) the first side is made from an inextensible (e.g., inelastic) material and (ii) the second side is made from an extensible (e.g., elastic) material. Further, the inflatable bladder is positioned so that the second side is adjacent to the user's body. In this way, when the inflatable bladder is inflated, the second side of the inflatable bladder bulges toward and interacts with the user's body (e.g., creates a frictional force with the user's body).

(A13) In some embodiments of A12, the first side of the inflatable bladder is made from flexible circuitry.

(A14) In some embodiments of any of A1-A13, the inflatable bladder is configured to receive a fluid from a source. For example, the source may be a pneumatic device and the inflatable bladder may be pneumatically coupled to the pneumatic device (e.g., via one or more conduits).

(A15) In some embodiments of A14, the source is in communication with a computing device, and the source is configured to change the pressure in the inflatable bladder in response to receiving one or more signals from the computing device.

(A16) In some embodiments of A15, the computing device is in communication with a head-mounted display that presents content to the user, the head-mounted display includes an electronic display, and the one or more signals correspond to content displayed on the electronic display.

(B1) In another aspect, the solution explained above can be implemented on a wearable device that includes a wearable structure configured to be worn by a user of the wearable device, and a grounding assembly, coupled to the wearable structure, that includes: (i) at least one inflatable bladder to receive a fluid from a source, wherein the at least one inflatable bladder is (a) shaped to fit, at least partially, around a respective portion of the user's body and (b) configured to expand when inflated to a desired pressure, and (ii) a textile that at least partially surrounds the at least one inflatable bladder and the respective portion of the user's body, the textile being configured to tighten around the respective portion of the user's body when the at least one inflatable bladder is inflated to the desired pressure.

(B2) In some embodiments of B1, the wearable device also includes at least one actuator, at least partially surrounded by the textile, configured to impart a haptic stimulation to the user at a target location. In such embodiments, the textile is further configured to press the at least one actuator to the user at the target location when the at least one inflatable bladder is inflated to the desired pressure.

(B3) In some embodiments of any of B1-B2, the wearable device also includes at least one sensor, at least partially surrounded by the textile, configured to measure a physical characteristic of the user at a target location. In such embodiments, the textile is further configured to press the at least one sensor to the user at the target location when the at least one inflatable bladder is inflated to the desired pressure.

(B4) In some embodiments of any of B1-B3, the grounding assembly further includes a sensor configured to measure a size of a respective portion of the user's body. In such embodiments, the desired pressure for the at least one inflatable bladder is set based on the size of the respective portion of the user's body measured by the sensor.

(B5) In some embodiments of any of B1-B4, when the wearable device is in an inactive state, the at least one inflatable bladder is unpressurized. Furthermore, when the wearable device is in an active state, the at least one inflatable bladder is pressurized to the desired pressure.

(B6) In some embodiments of any of B1-B4, when the wearable device is in an inactive state, the at least one inflatable bladder is unpressurized and when the wearable device is in a wakened state (e.g., the wearable device is turned on), the at least one inflatable bladder is pressurized to the desired pressure. Furthermore, when the wearable device is in an active state (e.g., during gameplay), the at least one inflatable bladder is pressurized to another desired pressure that is greater than the desired pressure.

(B7) In some embodiments of any of B1-B6, when an appendage of the user of the wearable device has a first size, the desired pressure for the at least one inflatable bladder is set to a first pressure level. Furthermore, when the appendage of the user of the wearable device has a second size greater than the first size, the desired pressure for the at least one bladder is set to a second pressure level that is less than the first pressure level.

(B8) In some embodiments of any of B1-B7, the source may be a pneumatic device and the inflatable bladder may be pneumatically coupled to the pneumatic device (e.g., via one or more conduits).

(B9) In some embodiments of B8, the source is in communication with a computing device, and the source is configured to change the pressure in the inflatable bladder in response to receiving one or more signals from the computing device.

(B10) In some embodiments of B9, the computing device is in communication with a head-mounted display that presents content to the user, the head-mounted display includes an electronic display, and the one or more signals correspond to content displayed on the electronic display.

(B11) In some embodiments, the wearable device includes the structural characteristics for the wearable device described above in any of A1-A13.

(C1) In yet another approach, the solution explained above can be implemented on a wearable device that includes: (i) a wearable structure configured to be worn by a user, and (ii) a grounding assembly (e.g., grounding assembly 702, FIG. 7A), coupled to the wearable structure, that includes: (a) an inflatable bladder, coupled to a first portion of the wearable structure, configured to receive a fluid from a source, and (b) a cord, coupled to a second portion of the wearable structure and the inflatable bladder, configured to tighten around a portion of the user's body according to and in proportion with a fluid pressure inside the inflatable bladder.

(C2) In some embodiments of C1, the wearable device also includes at least one actuator (or some other user-feedback element), coupled to the wearable structure, configured to impart a haptic stimulation to the user at a target location. In such embodiments, the cord is further configured to secure the at least one actuator to the user at the target location when tightened around the portion of the user's body.

(C3) In some embodiments of any of C1-C2, at least a portion of the cord is wrapped, at least partially, around the inflatable bladder, and the inflatable bladder is configured to pull the cord in a direction when the fluid pressure inside the inflatable bladder satisfies a threshold pressure, thereby causing the cord to tighten around the portion of the user's body.

(C4) In some embodiments of any of C1-C3, the cord is configured to be wound around the portion of the user's body in a predefined pattern.

(C5) In some embodiments of C4, the portion of the user's body includes one or more joints, and the predefined pattern of the cord is designed to not encumber the one or more joints of the portion of the user's body.

(C6) In some embodiments of any of C4-C5, the grounding assembly further includes a plurality of brackets coupled to the wearable structure, and the cord is fed through the plurality of brackets to form the predefined pattern.

(C7) In some embodiments of C6, the portion of the user's body is a finger of the user. In such embodiments, one or more first brackets of the plurality of brackets are positioned on a palmar side of the wearable structure and one or more second brackets of the plurality of brackets are positioned on a dorsal side of the wearable structure.

(C8) In some embodiments of any of C1-C7, the second portion of the wearable structure is configured to receive the portion of the user's body.

(C9) In some embodiments of any of C1-C8, the source is in communication with a computing device, and the source is configured to change the pressure in the inflatable bladder in response to receiving one or more signals from the computing device.

(C10) In some embodiments of C9, the computing device is in communication with a head-mounted display that presents content to the user, the head-mounted display includes an electronic display, and the one or more signals correspond to content displayed on the electronic display.

(D1) In yet another approach, the solution explained above can be implemented on an apparatus that includes at least one inflatable bladder, fluidically coupled to a source, shaped to fit at least partially around a respective portion of a user's body, the at least one inflatable bladder being configured to inflate in response to receiving a fluid from the source. The apparatus also includes a textile that at least partially surrounds the at least one inflatable bladder and the respective portion of the user's body, the textile being configured to tighten when the at least one inflatable bladder is inflated to a desired fluid pressure by the source.

(D2) In some embodiments of D1, the textile also at least partially surrounds a user-feedback element that is configured to interact with the user at a target location. In such embodiments, the textile is further configured to press the user-feedback element to the user at the target location when the at least one inflatable bladder is inflated to the desired fluid pressure by the source.

(D3) In some embodiments of D2, the user-feedback element is an actuator that is configured to impart a haptic stimulation to the user at the target location. Alternatively, the user-feedback element is a sensor that is configured to measure a physical characteristic of the user (e.g., heartbeat, blood pressure, temperature) at the target location.

(D4) In some embodiments of any of D2-D3, the respective portion of the user's body includes opposing first and second sides, the at least one inflatable bladder is to be positioned on the first side, and the user-feedback element is to be positioned on the second side.

(D5) In some embodiments of any of D1-D4, the at least one inflatable bladder includes: (i) a substrate and (ii) a membrane, coupled to the substrate, that is more elastic than the substrate. Furthermore, a portion of the membrane is configured to bulge away from the substrate when the at least one inflatable bladder is inflated to the desired fluid pressure by the source.

(D6) In some embodiments of D5, the substrate includes: (i) a channeled substrate, with opposing first and second surfaces, defining at least one channel in the first surface that is fluidically coupled to the source and the membrane, the at least one channel being designed to transport the fluid from the source to the membrane, and (ii) a cover (e.g., a textile or other fabric) adhered to the first surface of the channeled substrate.

(D7) In some embodiments of any of D1-D6, the source is in communication with a computing device, and the source is configured to change the pressure in the inflatable bladder in response to receiving one or more signals from the computing device.

Another solution (which can be combined with any of the embodiments discussed above) is a wearable device that implements improved passive grounding techniques. With this approach, portions of the wearable device are selectively stiffened such that the haptic-creating mechanisms attached thereto are securely attached to the user's body without having to attach/detach individual straps.

(E1) In one aspect, the wearable device includes a wearable structure configured to be worn by a user of the wearable device, wherein (i) a greatest degree of elasticity in a first portion of the wearable structure is in a first direction and (ii) a greatest degree of elasticity in a second portion of the wearable structure is in a second direction different from the first direction. The wearable device also includes a coating, coupled to the first portion of the wearable structure, configured to constrain elongation (e.g., stretch) of the wearable structure in at least one direction at one or more target locations along the second portion of the wearable structure. In some embodiments, the at least one direction is the first direction, the second direction, or some other direction.

(E2) In some embodiments of E1, the coating has a predefined geometry, and the predefined geometry of the coating is designed to constrain elongation of the wearable structure at the one or more target locations. In other words, the geometry of the coating is used to selectively stiffen portions (i.e., the target locations) of the wearable structure, especially when the user moves the wearable structure (e.g., makes a first while wearing the wearable structure).

(E3) In some embodiments of E2, the predefined geometry of the coating is further designed to constrain elongation of the wearable structure in the at least one direction.

In other words, the geometry of the coating is used to selectively stiffen portions of the wearable structure in the at least one direction.

(E4) In some embodiments of any of E2-E3, the wearable structure is configured to be worn on a first portion of the user's body that includes one or more joints (e.g., a user's finger), and the predefined geometry of the coating is further designed for the first portion of the user's body and defines openings (i.e., relief areas) for the one or more joints. In this way, the coating does not encumber movement of the one or more joints.

(E5) In some embodiments of E4, the first portion of the wearable structure is a dorsal portion of the wearable structure, and the first direction is a longitudinal direction.

(E6) In some embodiments of E5, the second portion of the wearable structure is a palmar portion of the wearable structure that is at least partially opposite to the dorsal portion of the wearable structure, and the second direction is a lateral direction.

(E7) In some embodiments of any of E1-E6, the wearable structure is configured to be worn on a hand of the user, the coating has varying degrees of elasticity, and the varying degrees of elasticity are set based on known hand movements (e.g., flexion and extension of the user's hand and fingers).

(E8) In some embodiments of any of E1-E7, the elasticity of the coating is based on one or more of: (i) a number of layers that compose the coating, (ii) a geometry of the coating, (iii) a thickness of the coating, (iv) a width of the coating, and (v) material properties of the coating.

(E9) In some embodiments of any of E1-E8, the wearable device also includes at least one actuator, coupled to the second portion of the wearable structure, configured to impart a haptic stimulation to the user at a first target location of the one or more target locations.

(E10) In some embodiments of any of E1-E9, the wearable device also includes at least one sensor, coupled to the second portion of the wearable structure, configured to measure a physical characteristic of the user at a first (or a second) target location of the one or more target locations.

(E11) In some embodiments of any of E1-E10, the wearable device is composed of a plurality of portions, including the first and second portions, and the plurality of portions are connected at a seam. Furthermore, a location of the coating on the first portion of the wearable structure is decoupled from a location of the seam.

(E12) In some embodiments of E11, the seam follows a gunn pattern or a fourchette pattern.

(E13) In some embodiments of any of E1-E12, the coating is also coupled to, at least partially, the second portion of the wearable structure.

(E14) In some embodiments of any of E1-E13, the coating is die cut or laser cut from a polymer substrate. Moreover, heat is applied to the coating to couple the coating with the first portion (and potentially the second portion) of the wearable structure.

In accordance with some embodiments, a computer system includes one or more processors/cores and memory storing one or more programs configured to be executed by the one or more processors/cores. The one or more programs include instructions for performing the operations of any of the methods described herein. In accordance with some embodiments, a non-transitory computer-readable storage medium has stored therein instructions that, when executed by one or more processors/cores of a computer system, cause the computer system to perform the operations of any of the methods described herein. In accordance with some embodiments, a system includes a wearable device, a head-mounted display (HMD), an external device (e.g., source 210, FIG. 2) and a computer system to provide video/audio feed to the HMD and instructions to the wearable device, the HMD, and/or the external device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 5A and 5B show an example grounding assembly in different pressurized states in accordance with some embodiments.

FIG. 6A shows various views of a grounding assembly that uses circumferential volume reduction in accordance with some embodiments.

FIGS. 6D-1 and 6D-2 show various views of a grounding assembly with built-in channels in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
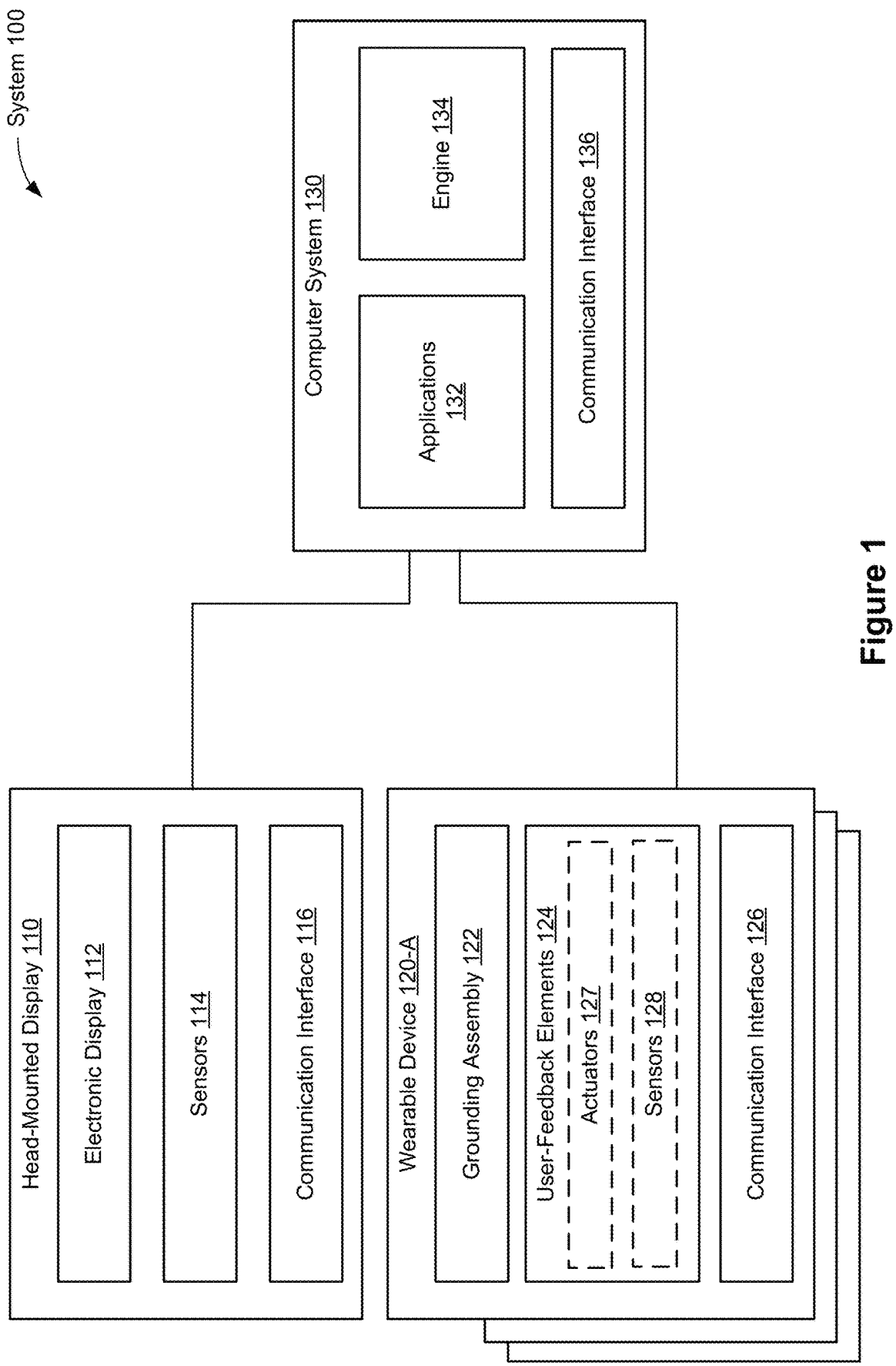
FIG. 1 is a block diagram illustrating an exemplary system in accordance with various embodiments.

FIG. 1 is a block diagram illustrating an artificial-reality system 100 in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more wearable devices 120 (sometimes referred to as "wearable apparatuses," or simply "apparatuses"), which are used in conjunction with a computer system 130 (sometimes referred to as a "computer device" or a "remote computer device") and a head-mounted display 110. In some embodiments, the system 100 provides the functionality of a virtual-reality device with haptic feedback, an augmented-reality device with haptic feedback, a mixed-reality device with haptic feedback, or a combination thereof.

The head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information.

The head-mounted display 110 includes an electronic display 112, sensors 114, and a communication interface 116. The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display to the computer system 130. In such embodiments, the communication interface 116 may also receive audio/visual data to be rendered on the electronic display 112.

The wearable device 120 includes a wearable structure worn by the user (e.g., a glove, a shirt, pants, or some other garment). In some embodiments, the wearable device 120 collects information about a portion of the user's body (e.g., the user's hand) that can be used as input for artificial-reality applications 132 executing on the computer system 130. In the illustrated embodiment, the wearable device 120 includes a grounding assembly 122, one or more user-feedback elements 124, and a communication interface 126. The wearable device 120 may include additional components that are not shown in FIG. 1, such as a power source (e.g., an integrated battery, a connection to an external power source, a container containing compressed air, or some combination thereof), one or more processors, memory, a display, microphones, and speakers.

The grounding assembly 122 is designed to secure (i.e., ground) the wearable structure and/or one or more user-feedback elements 124 to a portion of the user's body. To accomplish this, as will be described in more detail, the grounding assembly 122 is designed to tighten around the portion of the user's body when desired. The concept of grounding can be broken down into several categories, including (1) force transmission, (2) positioning, (3) fit, (4) and user experience. Positioning concerns the ability of a grounding assembly to prevent sliding, buckling, or shifting of sensors and actuators, while force transmission concerns the ability of a grounding assembly to prevent transmission losses (e.g., stretching the wearable structure instead of transmitting forces to the user's body). Fit relates to the ability of a grounding assembly to secure a wearable structure to a user and do so in a comfortable manner. User experience relates to the ability of a grounding assembly to improve an overall artificial-reality experience for a user, and this category in a way encapsulates each of the previous categories. Various embodiments of the grounding assembly 122 are described with reference to FIGS. 3A-9C below, and these categories are an underlying theme in the discussion below.

In some embodiments, the user-feedback element 124 can include one or more actuators 127 that are configured to impart haptic stimulations onto the user's body (e.g., at some predetermined target location). The one or more actuators 127 impart haptic stimulations onto the user by creating one or more forces that are transferred to the user's body (e.g., hand). In some embodiments, the one or more actuators 127 are driven by electricity (e.g., a stepper motor, a DC motor, a piezoelectric, or some other small form factor actuator). In some other embodiments, the one or more actuators 127 are driven by a fluid (e.g., air, gas, hydraulics, etc.). In such embodiments, the one or more actuators 127 may be made from an inflatable bladder or membrane.

In some embodiments, the user-feedback element 124 includes one or more sensors 128, which may be hardware devices that detect spatial and motion information about the wearable device 120. Spatial and motion information can include information about the position, orientation, velocity, rotation, and acceleration of the wearable device 120 or any subdivisions of the wearable device 120, such as fingers, fingertips, knuckles, the palm, or the wrist when the wearable device 120 is a glove. The sensors 128 may also be IMUs, as discussed above with reference to the sensors 114. In some embodiments, the sensors 128 may also include feedback sensors associated with operation of the grounding assembly 122 or the one or more actuators 127. In particular, these sensors 128 can provide feedback regarding the fit of the wearable structure on the portion of the user's body. In circumstances where the fit of the wearable structure could be improved (based on the feedback from the sensors 128), the grounding assembly 122 can be adjusted to improve the fit. In some embodiments, the sensors 128 may gather physiological information about the user. For example, the sensors 128 may be heart rate sensors, temperature sensors, or various other sensors used to measure physiological information about a person. In some embodiments, contact with the user's body is crucial for the sensors 128 to operate properly. As such and much like the actuator 127 used for haptic stimulations, the grounding assembly 122 can be adjusted to improve the fit of the wearable structure and, in turn, the sensor's 128 contact with the user's body.

The communication interface 126 enables input and output to the computer system 130. In some embodiments, the communication interface 126 is a single communication channel, such as USB. In other embodiments, the communication interface 126 includes several distinct communication channels operating together or independently. For example, the communication interface 126 may include separate communication channels for receiving control signals for the grounding assembly 122 and sending data from the sensors 128 to the computer system 130. The one or more communication channels of the communication interface 126 can be implemented as wired or wireless connections. In some embodiments, the communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet, HomePlug, etc.), and/or any other suitable communication protocol, including communication protocols not yet developed as of the filing date of this document.

The computer system 130 is a computing device that executes artificial-reality applications (e.g., virtual-reality applications, augmented-reality applications, and the like) to process input data from the sensors 114 on the head-mounted display 110 and the sensors 128 on the wearable device 120. The computer system 130 may also provide output data for (i) the electronic display 112 on the head-mounted display 110, (ii) the grounding assembly 122 on the wearable device 120, and (iii) the actuators 127 (or some other devices, as discussed below with reference to FIG. 2 below).

The computer system includes a communication interface 136 that enables input and output to other devices in the system 100. The communication interface 136 is similar to the communication interface 116 and the communication interface 126.

In some embodiments, the computer system 130 sends instructions (e.g., the output data) to the wearable device 120. In response to receiving the instructions, the wearable device 120 may actuate the grounding assembly 122 and/or the actuators 127. Alternatively, in some embodiments, the computer system 130 sends instructions to an external source (e.g., source 210, FIG. 2), such as a pneumatic device, and in response to receiving the instructions, the external source actuates the grounding assembly 122 (e.g., the output data bypasses the wearable device 120). Alternatively, in some embodiments, the computer system 130 sends instructions to the wearable device 120, which in turn sends the instructions to the external source. The external source may then actuate the grounding assembly 122 (or the actuators 127). Although not shown, in the embodiments that include a distinct external source, the external source may be connected to the head-mounted display 110, the wearable device 120, and/or the computer system 130 via a wired or wireless connection. The external source (sometimes just called a "source") may be a pneumatic device, a hydraulic device, some combination thereof, or any other device capable of adjusting pressure.

The computer system 130 can be implemented as any kind of computing device, such as an integrated system-on-a-chip, a microcontroller, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application-specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor. In some embodiments, the memory of the computer system 130 includes known impedances of a user's body (e.g., impedances determined during a calibration process, or during some prior use of the system 100 by a particular user). The known impedance may be used by the computer system 130 (e.g., controller 214) to control a fluid pressure inside an inflatable bladder on the wearable device 120 (discussed in more detail below with reference to FIG. 2).

The storage device provides non-volatile, bulk, or long-term storage of data or instructions in the computing device. The storage device may take the form of a magnetic or solid state disk, tape, CD, DVD, or other reasonably high-capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 further includes artificial-reality applications 132 and an artificial-reality engine 134. In some embodiments, the artificial-reality applications 132 and the artificial-reality engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

Each artificial-reality application 132 is a group of instructions that, when executed by a processor, generates artificial-reality content for presentation to the user. An artificial-reality application 132 may generate artificial-reality content in response to inputs received from the user via movement of the head-mounted display 110 or the wearable device 120. Examples of artificial-reality applications 132 include gaming applications, conferencing applications, video-playback applications, training applications, and many more.

The artificial-reality engine 134 is a software module that allows artificial-reality applications 132 to operate in conjunction with the head-mounted display 110 and the wearable device 120. In some embodiments, the artificial-reality engine 134 receives information from the sensors 114 on the head-mounted display 110 and provides the information to an artificial-reality application 132. Based on the received information, the artificial-reality engine 134 determines media content to provide to the head-mounted display 110 for presentation to the user via the electronic display 112 and/or a type of feedback to be created by the grounding assembly 122 and/or the actuators 127 of the wearable device 120. For example, if the artificial-reality engine 134 receives information from the sensors 114 on the head-mounted display 110 indicating that the user has looked to the left, the artificial-reality engine 134 generates content for the head-mounted display 110 that mirrors the user's movement in a virtual environment.

Similarly, in some embodiments, the artificial-reality engine 134 receives information from the sensors 128 on the wearable device 120 and provides the information to an artificial-reality application 132. The application 132 can use the information to perform an action within the virtual world of the application 132. For example, if the artificial-reality engine 134 receives information from the sensors 128 on the wearable device 120 that the user has closed his fingers around a position corresponding to a coffee mug in the virtual environment and raised his hand, a simulated hand in the artificial-reality application 132 picks up the virtual coffee mug and lifts it to a corresponding height. As noted above, the information received by the artificial-reality engine 134 can also include information from the head-mounted display 110. For example, cameras on the head-mounted display 110 may capture movements of the wearable device 120, and the application 132 can use this additional information to perform the action within the virtual world of the application 132.

The artificial-reality engine 134 may also provide feedback to the user. The provided feedback may be visual via the electronic display 112 in the head-mounted display 110 (e.g., displaying the simulated hand as it picks up and lifts the virtual coffee mug) and/or feedback via the grounding assembly 122 and/or the actuators 127 in the wearable device 120. For example, if the artificial-reality engine 134 receives information from the sensors 128 on the wearable device 120 that the user has put the wearable device on a portion of his or her body (e.g., user dons a glove), the artificial-reality engine 134 may signal the wearable device 120 (or some external source) to actuate the grounding assembly 122 (e.g., the user may feel the grounding assembly 122 tighten slightly around the portion of his or her body). In another example, if the artificial-reality engine 134 receives information from the sensors 128 on the wearable device 120 that the user has closed his fingers around a position corresponding to a coffee mug in the virtual environment and raised his hand, a simulated hand in the artificial-reality application 132 picks up the virtual coffee mug and lifts it to a corresponding height. At the same time (or slightly beforehand), the artificial-reality engine 134 may signal the wearable device 120 (or some external source) to actuate the grounding assembly 122 to secure a user-feedback element 124 (e.g., an actuator 127), to the portion of the user's body. In this way, the grounding assembly 122 can be used to prepare the user-feedback element 124, such as a haptic actuator 127, for imparting a haptic stimulation onto the user of the wearable device 120 (e.g., the haptic actuator 127 may create a haptic stimulation that corresponds to the user closing his or her hand around the virtual coffee mug).

As will be described in more detail below, the grounding assembly 122 includes one or more inflatable bladders (sometimes just called "bladders") that can be inflated (e.g., transitioned from a first pressurized state (e.g., atmospheric pressure) to a second pressurized state (e.g., inflated to a threshold pressure). Inflation of the one or more inflatable bladders can result in the bladders (or some associated structure) tightening around the portion of the user's body. In doing so, the wearable device 120 is designed so that said tightening results in (i) the wearable structure being tightened around the portion of the user's body, and/or (ii) one or more user-feedback elements being positioned in a predefined manner, relative to the user's body, at one or more target locations. Notably, the one or more inflatable bladders can be inflated to different pressures. For example, each inflatable bladder can be inflated to a first pressure, and then a second pressure. When inflated to the first pressure, the grounding assembly 122 tightens around the portion of the user's body, and when inflated to the second pressure, the grounding assembly 122 further tighten around the portion of the user's body. In another example, at least one inflatable bladder can be inflated to a different pressure relative to the pressures of the other inflatable bladders. In doing so, the grounding assembly 122 can be tailored to a specific part of a user's body, and also tailored to different user's body (e.g., the degree of tightening can be varied and precisely controlled from user to user).

As noted above, the grounding assembly 122 described herein is configured to transition between a first pressurized state and a second pressurized state to secure a user-feedback element (or multiple user-feedback elements) to the user. Due to the ever-changing nature of artificial reality, the grounding assembly 122 may be required to transition between the two states hundreds, or perhaps thousands of times, during a lifetime. Thus, structures of the grounding assembly 122 described herein are durable and designed to quickly transition from state to state. To provide some context, in the first pressurized state, a bladder 204 (FIG. 2) of the grounding assembly 122 do not impede free movement of or otherwise interact with a portion of the wearer's body. For example, a grounding assembly 122 incorporated into a glove is made from flexible materials that do not impede free movement of the wearer's hand and fingers. Because of this flexible, the grounding assembly 122 is configured to conform to a shape of the portion of the wearer's body when in the first pressurized state. However, once in the second pressurized state, the bladder 204 of the grounding assembly 122 is configured to interact with the portion of the wearer's body. For example, a respective bladder 204 of a grounding assembly 122 can cause the wearable structure to tighten around the portion of the user's body when the bladder 204 is in the second pressurized state, as mentioned above.

Figure 2:
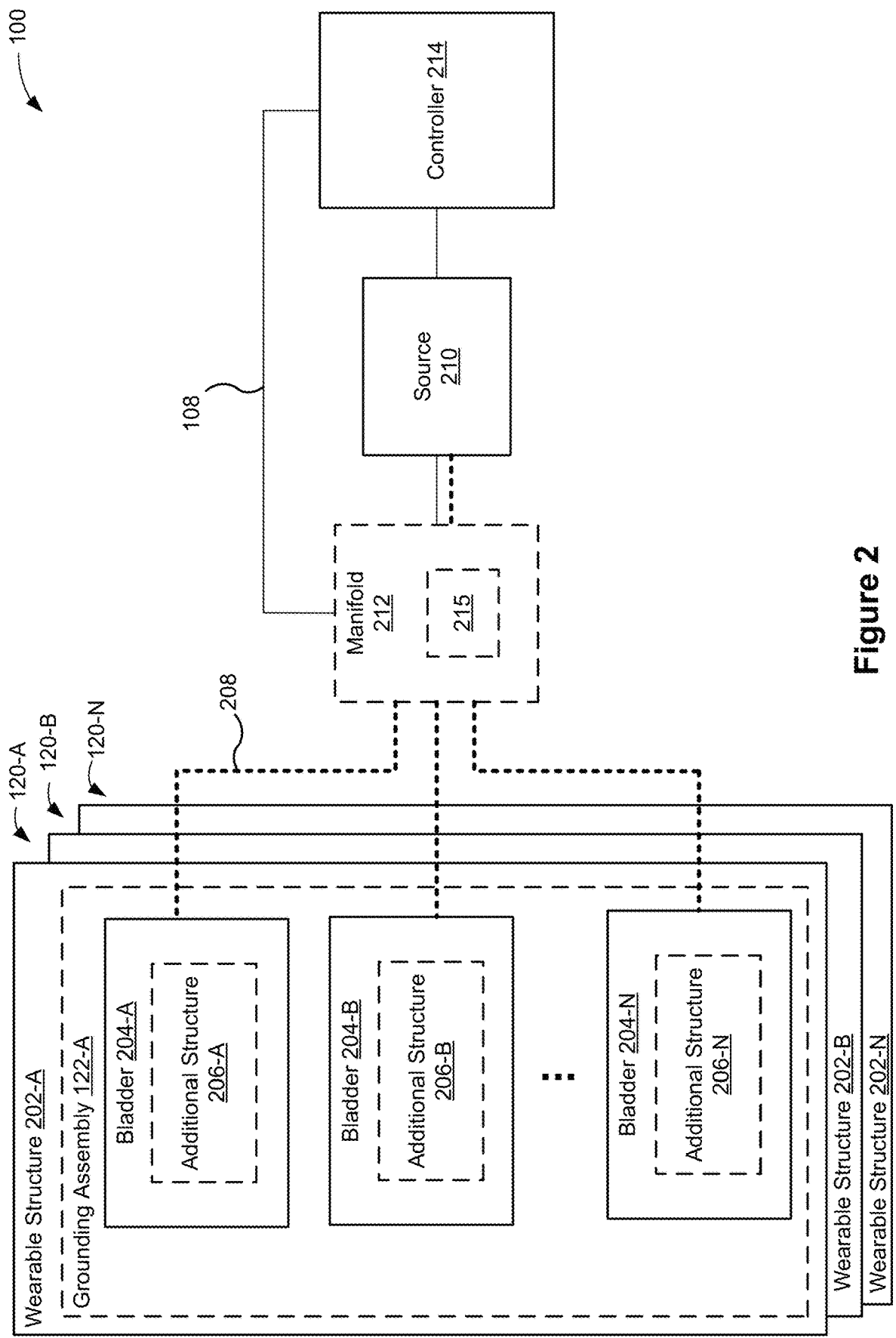
FIG. 2 is a schematic of an exemplary system in accordance with some embodiments.

FIG. 2 is a schematic of the system 100 in accordance with some embodiments. The components in FIG. 2 are illustrated in a particular arrangement for ease of illustration, and one skilled in the art will appreciate that other arrangements are possible. Moreover, while some example features are illustrated, various other features have not been illustrated for the sake of brevity and so as not to obscure pertinent aspects of the example implementations disclosed herein.

As a non-limiting example, the system 100 includes a plurality of wearable devices 120-A, 120-B, . . . 120-N, each of which includes a wearable structure 202 and at least one grounding assembly 122. As explained above, the grounding assemblies 122 are configured to secure (i.e., ground) the wearable structure 202 and/or a user-feedback element 124 to a portion of the user's body. The wearable structure 202 of each wearable device 120 can be various articles of clothing (e.g., gloves, socks, shirts, or pants), and, thus, the user may wear multiple wearable devices 120 on different parts of his or her body. Each grounding assembly 122 is coupled to (e.g., embedded in) the wearable structure 202. Further, each grounding assembly 122 includes one or more bladders 204 and, optionally, some additional structure 206. Each bladder 204 (e.g., a membrane) is a sealed, inflatable bladder made from a durable, puncture resistant material, such as thermoplastic polyurethane (TPU) or the like. The bladder 204 contains a fluid (e.g., air, an inert gas, or some other fluid) that can be added to or removed from the bladder 204 to change a pressure inside the bladder 204.

In some embodiments, the additional structure 206 includes a least one substrate that is made from either a flexible material (e.g., an elastic polymer or textile) or an inflexible material (e.g., an inelastic polymer or textile). In some embodiments, the additional structure 206 includes a textile that at least partially surrounds the bladder 204, such as the textile 402 (FIGS. 4A-4D). The textile may be made from elastic or inelastic materials, or some combination thereof. In some embodiments, the additional structure 206 includes a cord (or some other tension-holding structure) that is configured to wrap at least partially around a portion of the user's body. As will be described below with reference to FIGS. 7A-7C, the cord may be the portion of the grounding assembly 122 that tightens around the user's body to secure the wearable structure 202 and/or the user-feedback element 124 to the portion of the user's body. In some embodiments, the additional structure 206 is one or more user-feedback elements 124. For example, one or more sensors 128 and/or one or more haptic actuators 127 may be positioned near or coupled to one or more of the bladders 204 of a respective grounding assembly 122.

The system 100 also includes a controller 214 and a source 210. In some embodiments, the controller 214 is part of the computer system 130 (e.g., the processor of the computer system 130). The controller 214 is configured to control operation of the source 210, and in turn operation of the wearable devices 120. For example, the controller 214 may send one or more signals to the source 210 to activate the source 210 (e.g., turn it on and off). The one or more signals may specify a desired pressure (e.g., pounds-per-square inch) to be output by the source 210. Generation of the one or more signals, and in turn the pressure output by the source 210, may be based on information collected by the sensors 114 and/or the sensors 128. For example, the one or more signals may cause the source 210 to increase the pressure inside a first bladder 204 at a first time, based on the information collected by the sensors 114 and/or the sensors 128 (e.g., the user put on the wearable device 120). Then, the controller may send one or more additional signals to the source 210 that cause the source 210 to further increase the pressure inside the first bladder 204 at a second time after the first time, based on additional information collected by the sensors 114 and/or the sensors 128 (e.g., the user contacts a virtual coffee mug). Further, the one or more signals may cause the source 210 to inflate one or more bladders 204 in a first wearable device 120-A, while one or more bladders 204 in a second wearable device 120-B remain unchanged. Additionally, the one or more signals may cause the source 210 to inflate one or more bladders 204 in a first wearable device 120-A to a first pressure and inflate one or more other bladders 204 in the first wearable device 120-A to a second pressure different from the first pressure. Depending on the number of wearable devices 120 serviced by the source 210, and the number of bladders 204 therein, many different inflation configurations can be achieved through the one or more signals and the examples above are not meant to be limiting. While not shown, the source 210 may also service one or more haptic actuators 127 that operate on fluid pressure.

The system 100 may include an optional manifold 212 between the source 210 and the wearable devices 120. The manifold 212 may include one or more valves (not shown) that fluidically (e.g., pneumatically, hydraulically, etc.) couple each of the grounding assemblies 122 with the source 210 via one or more conduits 208 (e.g., tubing). In some embodiments, the manifold 212 is in communication with the controller 214, and the controller 214 controls the one or more valves of the manifold 212 (e.g., the controller generates one or more control signals). The manifold 212 is configured to switchably couple the source 210 with one or more grounding assemblies 122 of the same or different wearable devices 120 based on one or more control signals from the controller 214. In some embodiments, instead of using the manifold 212 to fluidically couple the source 210 with the grounding assembly 122, the system 100 may include multiple sources 210, where each is fluidically coupled directly with a single (or multiple) bladder(s) 204. In some embodiments, the source 210 and the optional manifold 212 can be configured as part of one or more of the wearable devices 120 (not illustrated) while, in other embodiments, the source 210 and the optional manifold 212 can be configured as external to the wearable device 120. A single source 210 may be shared by multiple wearable devices 120.

In some embodiments, the manifold 212 includes one or more back-flow valves 215 that are configured to selectively open and close to regulate fluid flow between the manifold 212 from the bladders 204. When closed, the one or more back-flow valves 215 stop fluid flowing from the bladders 204 back to the manifold 212. In some other embodiments, the one or more back-flow valves 215 are distinct components separate from the manifold 212.

In some embodiments, the source 210 is a hydraulic device, a pneudraulic device, or some other device capable of adding and removing a medium/fluid from the one or more grounding assemblies 122. In other words, the discussion herein is not limited to pneumatic devices, but for ease of discussion, pneumatic devices are used as the primary example in the discussion below.

The devices shown in FIG. 2 may be coupled via a wired connection (e.g., via busing 108). Alternatively, one or more of the devices shown in FIG. 2 may be wirelessly connected (e.g., via short-range communication signals).

Figure 3A:
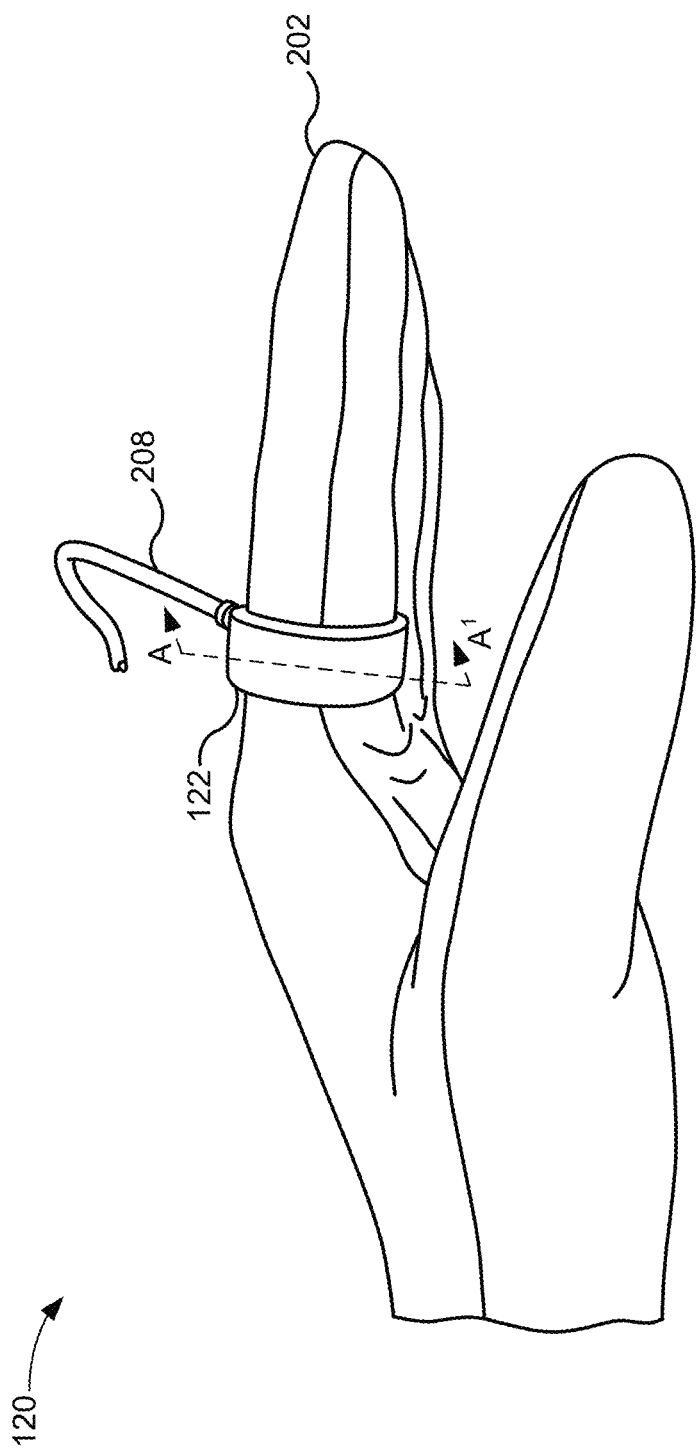
FIGS. 3A-3C show various views of an example grounding assembly in accordance with some embodiments.
Figure 3B:
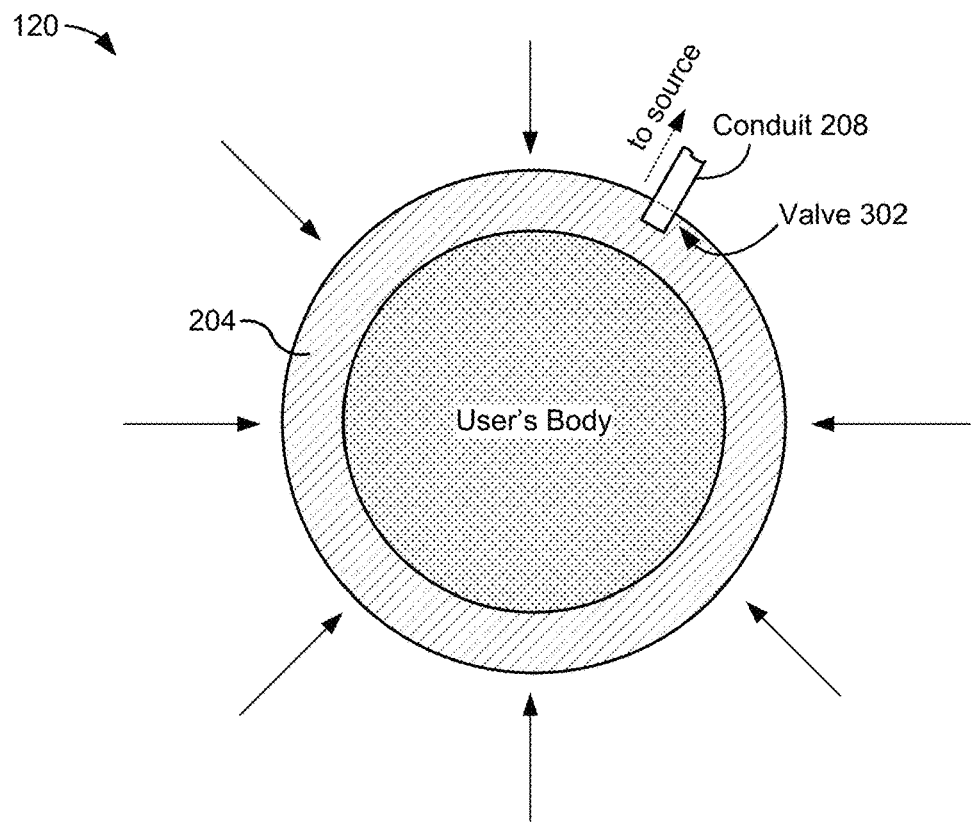
Figure 3C:
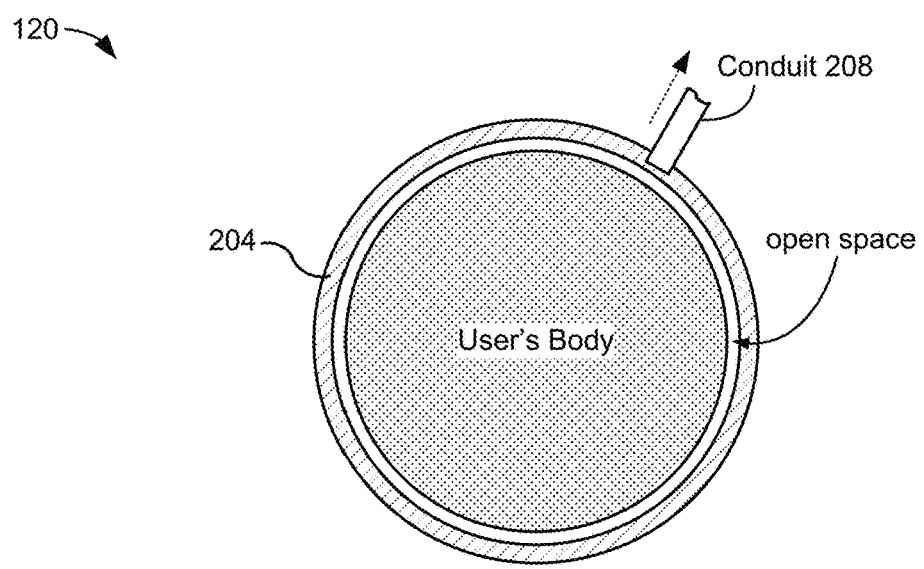

FIGS. 3A-3C show various views of an example grounding assembly 122 in accordance with some embodiments. In particular, FIG. 3A shows the example grounding assembly 122 attached to a user's hand while FIGS. 3B-3C show cross-sectional views of the example grounding assembly 122 in different states (taken along line A-A$^1$ in FIG. 3A). As shown in FIG. 3A, the grounding assembly 122 is attached to the wearable structure 202 of the wearable device 120, which is configured to be worn on a portion of the user's body (e.g., the user's hand). As mentioned above, the grounding assembly 122 includes at least one inflatable bladder 204 that is fluidically coupled to a source 210 (e.g., a pneumatic device) via a conduit 208. Notably, with this configuration, a user can quickly take the wearable device 120 on and off by adjusting a pressure inside the bladder 204 of the grounding assembly 122. For example, when removal of the wearable device 120 is desired, the pressure inside the bladder 204 is lowered, which creates separation (or, at a minimum, less friction) between the bladder 204 and the user's body (as shown in FIG. 3C), thereby allowing the user to freely remove the wearable device 120. Moreover, with the pressure inside the bladder 204 lowered, the wearable device 120 can also be easily donned by the same user or a different user, and thereafter, the pressure inside the bladder 204 can be increased to a desired pressure to secure the wearable structure 202 to the user. In the past, such seamless donning and doffing of a wearable device was not possible because the most common grounding mechanism was a physical strap (e.g., a Velcro strap), which would require substantial user interaction during the donning and doffing processes (e.g., the Velcro straps would have to be undone and physically retightened between users, or even the same user).

As shown by the cross-sectional views of FIGS. 3B and 3C, the bladder 204 of the grounding assembly 122 may completely surround a portion of the user's body (in this case, a finger on the user's left hand). Alternatively, the bladder 204 of the grounding assembly 122 may only partially surround the user's body. Regardless its particular design, the bladder 204 is configured to inflate and exert a force on the portion of the user's body (indicated by inward facing arrows in FIG. 3B). The bladder 204 is also configured to deflate and stop exerting the force on the portion of the user's body (indicated by open space in FIG. 3C). When the bladder 204 is deflated (i.e., not pressurized by the source 210), the user is able to remove the wearable device 120 from his or her body.

In some embodiments, the bladder 204 defines an opening that is sized to accommodate a valve 302, as shown in FIG. 3B (dotted line). The valve 302 is fitted into the opening so that the bladder 204 remains sealed (i.e., airtight). The valve 302 also defines an opening that is sized to receive an end of a respective conduit 208. Alternatively, in some embodiments, the bladder 204 defines an opening, and the opening is sized to receive an end of the respective conduit 208. In either case, an adhesive may be deposited around a perimeter of the opening defined by the bladder 204 to ensure that the bladder 204 remains sealed. An example of the valve 302 is shown in FIG. 3D.

Figure 6B:
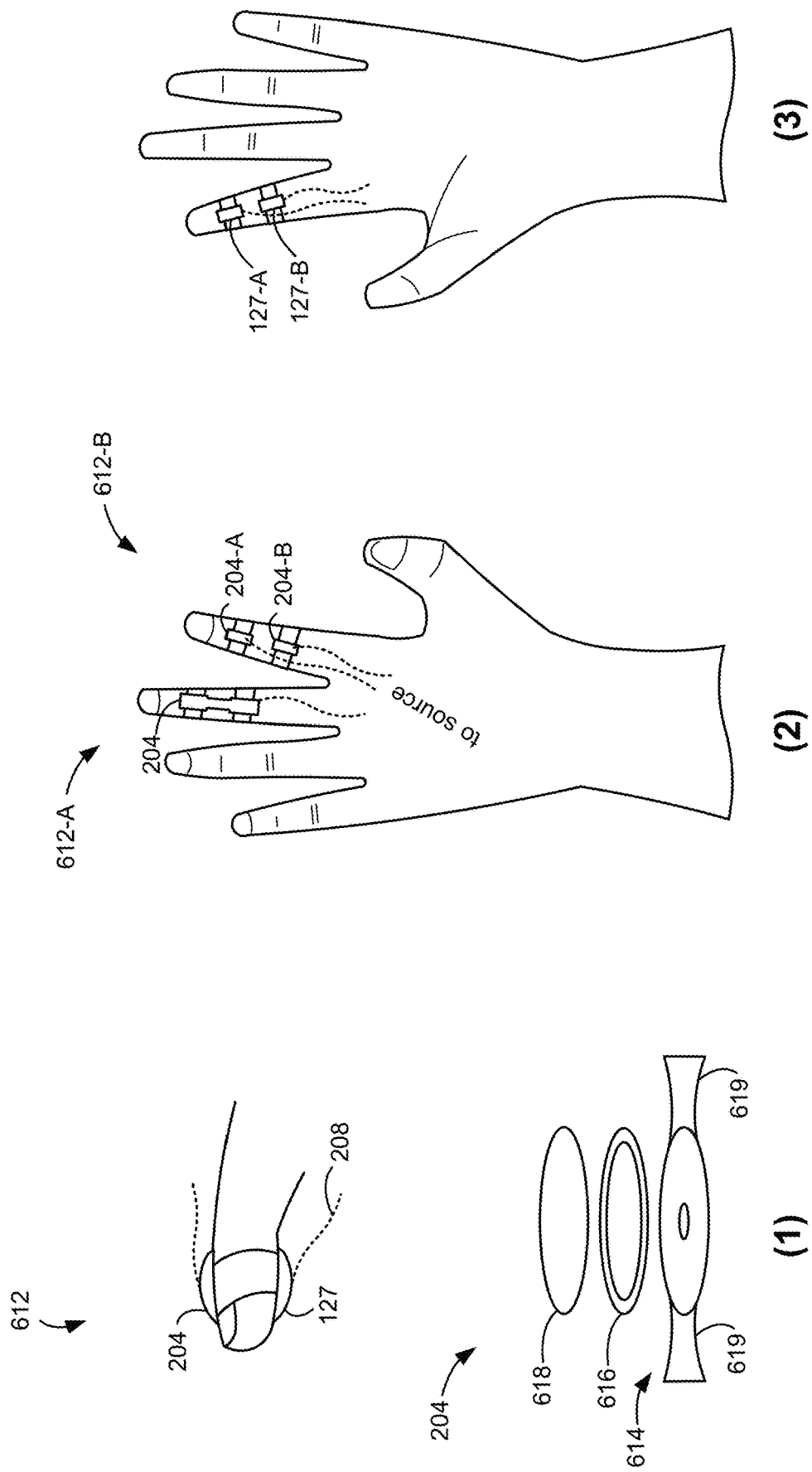
FIG. 6B shows various views of a grounding assembly that uses targeted volume reduction in accordance with some embodiments.

As described with reference to FIGS. 4A through 7C below, various active grounding assembly designs may be used in the wearable device 120, each of which is configured to secure the wearable structure 202 and/or some other user-feedback element 124 to the user when the bladder 204 is pressurized. For example, the example grounding assembly 122 may include at least one inflatable bladder 204 that surrounds, at least partially, a portion of the user's body, as shown in FIGS. 3A-3C. In another example, the example grounding assembly 122 may include (i) at least one inflatable bladder 204 coupled to a first portion of the wearable structure 202 and (ii) a tightening mechanism (e.g., a cord), coupled to a second portion of the wearable structure 202 and the inflatable bladder 204, that is configured to tighten around a portion of the user's body according to and in proportion with a fluid pressure inside the inflatable bladder 204, as shown in FIGS. 7A-7C. Various other designs and examples are also discussed herein.

Figure 3D:
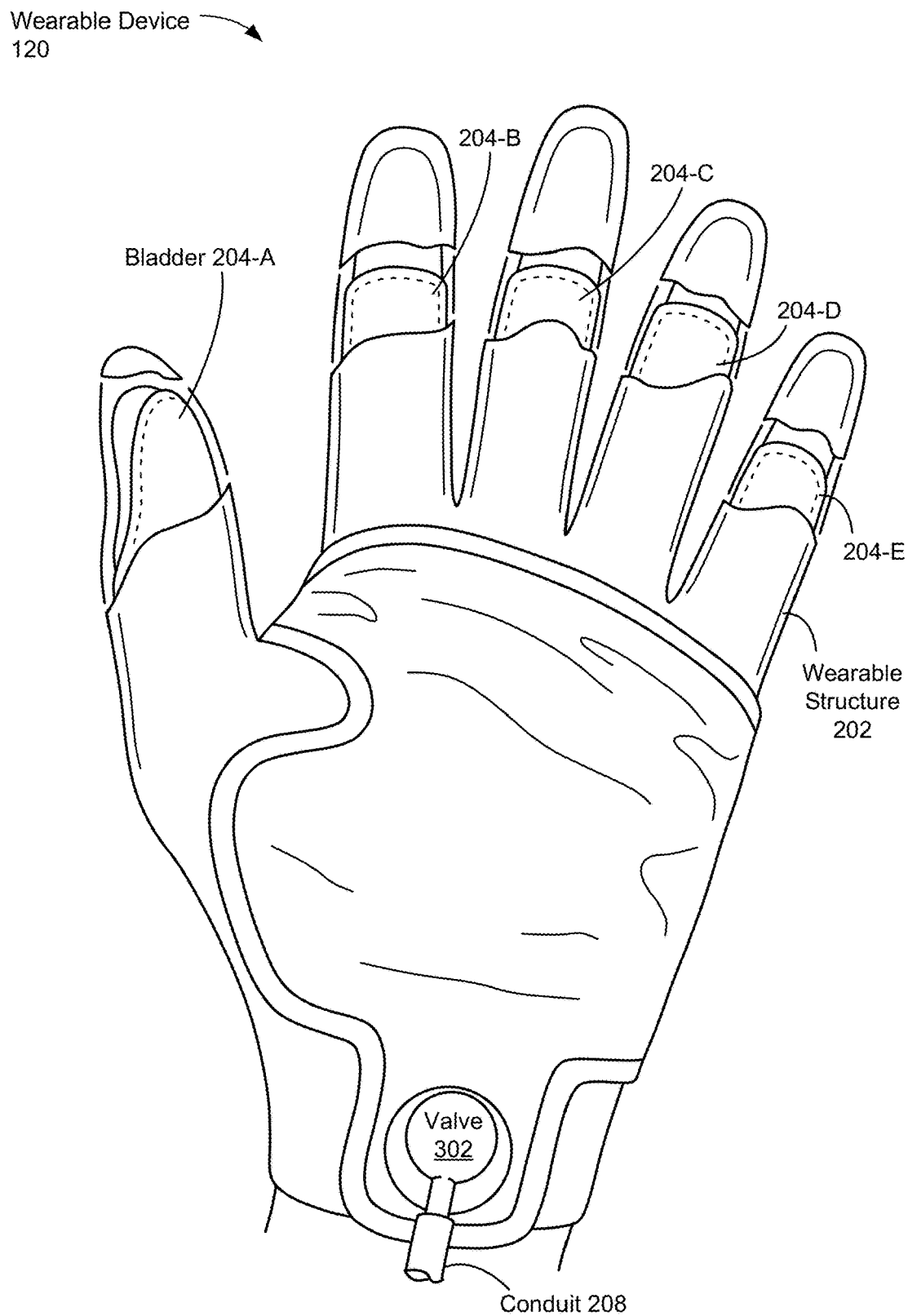
FIG. 3D shows a representative wearable device that includes a grounding assembly with multiple bladders in accordance with some embodiments.

FIG. 3D shows a representative wearable device 120 that includes a grounding assembly 122 consisting of multiple bladders 204-A-204-E in accordance with some embodiments. The wearable device 120 includes five bladders 204 coupled to a wearable structure 202. In this example, each bladder 204 is positioned on the palmar side of the user's hand (i.e., each bladder 204 does not entirely wrap around the corresponding finger). In other embodiments, each bladder 204 may be positioned on the dorsal side of the user's hand, on left and right sides of each finger, or wrap entirely around each finger.

The wearable device 120 includes an instance of the valve 302, which is fluidically coupled to the source 210 via a conduit 208. In the illustrated embodiment, the valve 302 is fluidically coupled with each of the bladders 204, and the valve 302 is configured to add and remove a fluid (e.g., air or other medium) from the bladders 204. In other embodiments (not shown), each bladder 204 has a distinct valve 302, and in this way, each of the bladders 204 can be individually serviced by the source 210. For example, the bladder 204-A can be inflated while the bladders 204-B through 204-E remain at atmospheric pressure. In another example, the bladder 204-A can be inflated to a first pressure while the bladders 204-B through 204-E are inflated to different second pressures. Various other configurations are possible.

It is noted that the arrangement of the bladders 204 in FIG. 3D is merely one possible arrangement of bladders 204. Typically, the bladders 204 of a respective grounding assembly 122 are positioned to not encumber a user's movements, even when the bladders 204 are inflated. As one example, this means that the bladders of the respective grounding assembly 122 are not positioned at joints. Nevertheless, in some instances, it might be desired to position one or more bladders 204 at one or more joints of the user.

For the purposes of the discussion below, "haptic stimulations" (e.g., tactile feedback and/or haptic feedback) may include but are not limited to a touch stimulation, a swipe stimulation, a pull stimulation, a push stimulation, a rotation stimulation, a heat stimulation, a pulsating stimulation, a vibration stimulation, and/or a pain stimulation. In some embodiments, the grounding assembly 122 is used to generate one or more haptic stimulations. In addition, the haptic actuators 127 of the wearable device 120 can also be used to create haptic stimulations.

FIGS. 4A-4D show different shapes taken by the example grounding assembly 122 of FIG. 3A in accordance with some embodiments. In particular, FIGS. 4A-4D show various configurations of the bladder 204 (or bladders 204)

included in the example grounding assembly 122. Also, FIGS. 4A-4D show how a textile 402 of the grounding assembly 122 can be strained by the various configurations of the bladder(s) 204. For ease of illustration, the wearable structure 202 is only shown in FIG. 4B. However, it should be understood that the wearable structure 202, while not shown, is part of the structures shown in FIGS. 4A and 4C-4D.

It is also noted that in the description of FIGS. 4A-4D below, the textile 402 is discussed as being a separate component from the bladder 204. However, in some embodiments, the textile 402 is a component of the bladder 204. For example, as explained with respect to FIGS. 6A-6B, the bladder 204 includes several components including an inelastic substrate 604 (FIG. 6A) and 614 (FIG. 6B). In some embodiments, the textile 402 discussed with reference to FIGS. 4A-4D and 5A-5B may be an example of the inelastic substrates discussed with reference to FIGS. 6A-6G.

Figure 4A:
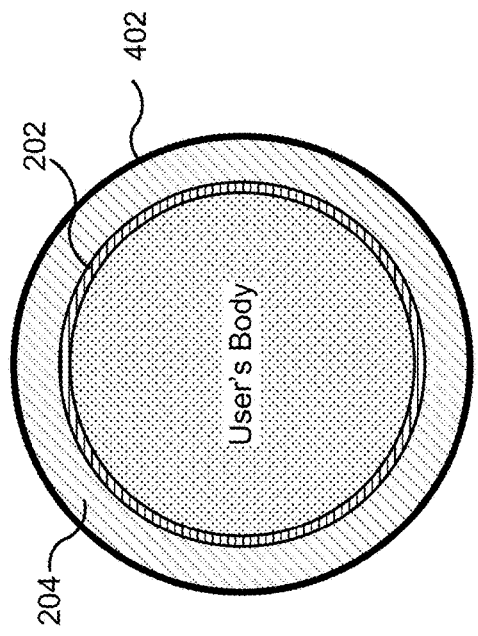
FIGS. 4A-4D show different shapes taken by an example grounding assembly in accordance with some embodiments.

In FIG. 4A, the bladder 204 is positioned on a top half of the user's body and surrounded by the textile 402 (e.g., the textile 402 surrounds the bladder 204 and the user's body). Accordingly, when inflated (as shown in FIG. 4A), the bladder 204 expands upwards and, in doing so, pushes the textile 402 upwards, which creates tension in the textile 402 along a bottom portion of the user's body (as indicated by dotted line). The bladder design in FIG. 4A could be used, as one example, to secure (i.e., ground, fix) a user-feedback element 124 (e.g., actuator 127 or sensor 128) to the user at a target location on the user's body (e.g., along a bottom portion of the user's body). It is noted that a similar but opposite result could be achieved by positioning the bladder 204 on a bottom half of the user's body. In this alternate example, when inflated, the bladder 204 pushes the textile 402 downwards, which creates tension in the textile 402 along a top portion of the user's body. The bladder design in FIG. 4A is not limited to top and bottom halves (e.g., palmar and dorsal halves) of the user's body. Rather, the bladder design in FIG. 4A can be positioned in various orientations on the user's body (e.g., sideways, diagonally, etc.). While not shown in FIG. 4A, the wearable structure 202 would separate the bladder 204 and the textile 402 from the user's body.

Figure 4B:
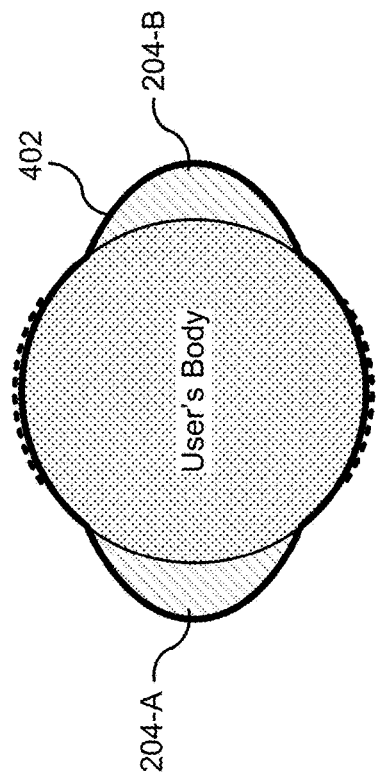

In FIG. 4B, the bladder 204 and the textile 402 surround the portion of the user's body. When inflated (as shown in FIG. 4B), the bladder 204 pushes against the wearable structure 202 and, in turn, the user's body (i.e., the wearable structure 202 tightens around the portion of the user's body). The bladder design in FIG. 4B could be used, as one example, to secure (i.e., ground, fix) the wearable device 120 to the user's body. The bladder design in FIG. 4B could also be used to secure a user-feedback element 124 (e.g., actuator 127 or sensor 128) to the user at a target location on the user's body. In some embodiments, an inner surface of the bladder 204 is a high friction material, which is used to increase a frictional force between the bladder 204 of the user's skin. Note that one or more portions of the inner surface of the bladder 204 may be high friction portions while one or more other portions of the inner surface of the bladder 204 may be lower friction portions. In some embodiments, an inner surface of the wearable structure 202 is a high friction material, which is used to increase a frictional force between the wearable structure 202 and the user's skin. In some instances, the high friction areas help to prevent a user-feedback element from shifting or twisting.

Figure 4C:
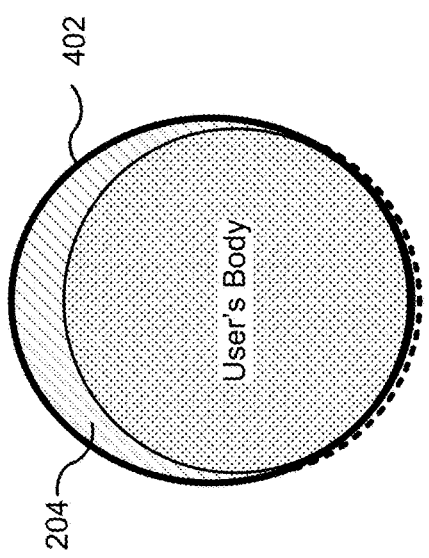

In FIG. 4C, the bladder 204 is positioned on a top side of the user's body and surrounded by the textile 402 (e.g., the textile 402 surrounds the bladder 204 and the user's body). Accordingly, when inflated (as shown in FIG. 4C), the bladder 204 expands upwards and, in doing so, pushes the textile 402 upwards, which creates tension in the textile 402 along a bottom portion of the user's body (as indicated by dotted line). The bladder design in FIG. 4C is similar to the bladder design in FIG. 4A in that both designs can be used to create tension in the textile 402 along an opposite portion of the user's body. However, the bladder design in FIG. 4C can be used to focus the tension to a smaller area, which may be needed for a particular application. For example, the bladder design in FIG. 4A may not adequately secure a user-feedback element 124 to a particular portion of the user's body and, consequently, the bladder design in FIG. 4C may be used instead to sufficiently secure the user-feedback element 124 to the particular portion of the user's body. The bladder design in FIG. 4C is not limited to top and bottom halves (e.g., palmar and dorsal halves) of the user's body. Rather, the bladder design in FIG. 4C can be positioned in various orientations on the user's body (e.g., sideways, diagonally, etc.). Again, while not shown in FIG. 4C, the wearable structure 202 would separate the bladder 204 and the textile 402 from the user's body.

Figure 4D:
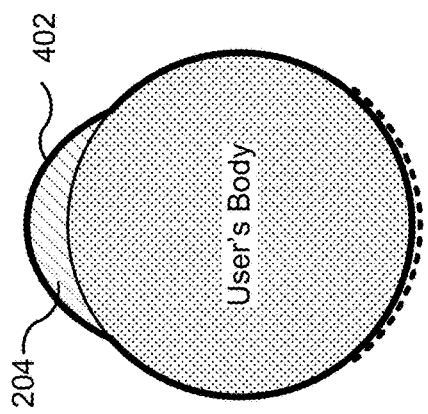

In FIG. 4D, two bladders 204 are positioned on lateral sides of the user's body and surrounded by the textile 402 (e.g., the textile 402 surrounds the bladder 204 and the user's body). Accordingly, when inflated (as shown in FIG. 4D), the bladder 204 expands and pushes the textile 402 outward (e.g., leftward and rightward), which creates tension in the textile 402 at top and bottom portions of the user's body (as indicated by dotted lines). The bladder design in FIG. 4D could be used, as one example, to secure (i.e., ground, fix) multiple user-feedback elements 124 to the user at different target locations on the user's body (e.g., along top and bottom portions of the user's body). The bladder design in FIG. 4D is not limited to the configuration shown there. Rather, the bladders in FIG. 4D can be positioned in various orientations on the user's body (e.g., sideways, diagonally, etc.). Again, while not shown in FIG. 4D, the wearable structure 202 would separate the bladder 204 and the textile 402 from the user's body.

FIGS. 5A and 5B show the grounding assembly 122 in different pressurized states in accordance with some embodiments. In particular, FIG. 5A shows the grounding assembly 122 with an inflatable bladder 204 surrounded by an elastic textile 402 (dashed line). FIG. 5A also shows the bladder 204 in two states, unpressurized on the left and pressurized on the right. When unpressurized (left) (i.e., in an unpressurized state), the bladder 204 and the elastic textile 402 do not impart noticeable forces onto the user's body. Accordingly, when unpressurized (left), the user can don and doff the wearable device 120 (e.g., glove) with ease. When pressurized (right) (i.e., in a pressurized state), the bladder 204 inflates, causing the elastic textile 402 to stretch and strain. When strained, the elastic textile 402 tightens around the user's body and, in doing so, imparts forces onto the user's body, thus securing the wearable structure 202 to the user's body (while not shown in FIG. 5A, the wearable structure 202 would separate the bladder 204 and the textile 402 from the user's body). In addition, in those embodiments where the wearable device 120 includes one or more user-feedback elements 124, the strained textile 402 would also impart forces onto the one or more user-feedback elements 124. For example, as shown in FIG. 5A, the strained textile 402 secures the user-feedback element 124 at a target location 404 on the user's body, when the bladder 204 is pressurized. Of importance here, the user-feedback element 124 becomes positioned in a predefined manner, relative to the user's body, at the target location 404 when the bladder 204 is pressurized (e.g., the user-feedback element 124 becomes fitted against the user's body such that accurate measurements can be derived from the user's body (e.g., when the user-feedback element 124 is a sensor 128) or haptic stimulations of sufficient magnitude can be imparted onto the user's body (e.g., when the user-feedback element 124 is a haptic actuator 127)).

It is noted that a degree of expansion of the bladder 204 will vary from user to user. For example, if the user has larger than average fingers, a lesser degree of expansion of the bladder 204 is needed in order for the bladder 204 to push against the user's body. Conversely, if the user has smaller than average fingers, a greater degree of expansion of the bladder 204 is needed in order for the bladder 204 to push against the user's body. In some embodiments, one or more sensors 128 are incorporated into the grounding assembly 122 that provide feedback regarding the degree of expansion needed for the bladder 204 for the particular user. For example, the one or more sensors 128 may be pressure sensors that indicate how much pressure is being applied to the particular user for the bladder 204, when inflated. An example sensor 128 is shown in FIG. 5B.

FIG. 5B shows the grounding assembly 122 with an inflatable bladder 204 surrounded by an inelastic textile 402 (thick solid line). In contrast to FIG. 5A, the wearable structure 202 is the component of the wearable device 120 that is made from an elastic material (dashed line). Like FIG. 5A, FIG. 5B shows the bladder 204 unpressurized on the left and pressurized on the right. When unpressurized (left), the bladder 204 and the inelastic textile 402 do not impart noticeable forces onto the user's body. Rather, when unpressurized (left), an open space is formed between the bladder 204 and the wearable structure 202, which allows the user to don and doff the wearable device 120 (e.g., glove) with ease. When pressurized (right), the bladder 204 inflates, causing the inelastic textile 402 to move upward and tighten around the user's body and, in doing so, impart forces onto the user's body, thus securing the wearable structure 202 to the user's body (while not shown in FIG. 5B, the wearable structure 202 would separate the bladder 204 and the textile 402 from the user's body). The embodiment in FIG. 5B could also be used to secure a user-feedback element 124 at a target location 404 on the user's body, as explained above with reference to FIG. 5A.

Various embodiments of the grounding assembly 122 are illustrated and described below. For example, a first embodiment of the grounding assembly 122 is illustrated and described with reference to FIG. 6A. A second embodiment of the grounding assembly 122 is illustrated and described with reference to FIG. 6B. A third embodiment of the grounding assembly 122 is illustrated and described with reference to FIG. 6C. A fourth embodiment of the grounding assembly 122 is illustrated and described with reference to FIG. 6D. A fifth embodiment of the grounding assembly 122 is illustrated and described with reference to FIGS. 6E-6F. A sixth embodiment of the grounding assembly 122 is illustrated and described with reference to FIG. 6G. A seventh embodiment of the grounding assembly 122 is illustrated and described with reference to FIGS. 7A-7C.

These embodiments of the grounding assembly 122 are designed to be integrated with (e.g., embedded in or coupled to) various wearable devices 120, such as a glove (various other garments could be used as well). Furthermore, the embodiments of the grounding assembly 122 can be designed to not encumber the user's body (e.g., the grounding assemblies 122 generally are not positioned on the user's joints and are made from flexible materials that do need impede movement of the user's body). While not shown in each figure, other components of the wearable device 120 discussed above (e.g., user-feedback elements 124, the wearable structure 202, etc.) can be incorporated into the designs detailed below.

First Embodiment—Grounding Assembly with Circumferential Volume Reduction

FIG. 6A shows various views of a grounding assembly 602, which is an example of the grounding assembly 122. As shown (left, (1)), the grounding assembly 602 is designed to wrap around a portion of a user's body (e.g., the user's index finger) and secure one or more user-feedback elements 124, in this example a haptic actuator 127, at a target location on the user's body (e.g., on a palmar side of the user's index finger). While not shown, the grounding assembly 602 may also be configured to secure the wearable structure 202 to the user's body, as shown in FIG. 3A. Securing user-feedback elements and wearable structures 202 to a user's body is discussed in further detail above with reference to FIGS. 5A-5B.

The grounding assembly 602 includes (i) at least one bladder 204 configured to receive a fluid (e.g., air, gas, compressible fluid, etc.) from the source 210 and (ii) (optionally) a textile 402 that surrounds the at least one bladder 204. As shown, the bladder 204 includes an inelastic substrate 604 coupled to an elastic membrane 608 by an adhesive 606. The inelastic substrate 614 includes an opening sized to receive a conduit 208. In the grounding assembly 602, the elastic membrane 608 is the portion of the bladder 204 that contacts the user's body (i.e., the elastic membrane 608 is adjacent to the user's body). As such, when pressurized by the source 210 and because the inelastic substrate 604 in less elastic than the elastic membrane 608, the elastic membrane 608 expands (e.g., bulges) and presses against the wearable structure 202 (not shown) and the portion of the user's body. The bladder 204 shown in FIG. 6A is configured to operate in a similar way to the bladder 204 shown in FIGS. 4A and 5A-5B. In some embodiments including the optional textile 402, the inelastic substrate 604 and the textile 402 are separate from each other. Alternatively, as explained above with reference to FIG. 4A, the textile 402 may be part of the bladder 204 (i.e., the inelastic substrate 604 composes part or all of the textile 402).

The middle (2) and right (3) views in FIG. 6A show the grounding assembly 602 attached to the user's hand. In this example, the grounding assembly 602 includes two bladders 204-A, 204-B (note that the grounding assembly 602 could include more than two bladders 204). For ease of illustration and discussion, the wearable structure 202 is not shown in FIG. 6A. The middle view (2) shows a back of the user's hand while the right view (3) shows a palm of the user's hand. As shown, each bladder 204 wraps around the user's index finger, and each secures a respective haptic actuator 127 to the user's index finger at separate target locations. In some embodiments (as shown), each bladder 204 is fluidically coupled to the source 210 by a separate conduit 208. In some other embodiments, each bladder 204 is fluidically coupled to the source 210 by the same conduit 208. It is noted that this grounding assembly 602 can accommodate various user-feedback elements 124, and the positioning of the user-feedback element (or elements) 124 is not limited to the positioning of the actuator 127 shown in FIG. 6A. Moreover, the user-feedback element 124 is optional, and in those embodiments lacking a user-feedback element 124, the grounding assembly 602 is nevertheless still configured to secure the wearable structure 202 to the user's body.

Also, the grounding assembly 602 is not limited to the configurations shown in FIG. 6A. In other words, the concepts shown in FIG. 6A could be used to resize the grounding assembly 602 so that it could be attached to other portions of the user's body (e.g., leg, forearm, bicep, etc.).

Second Embodiment—Grounding Assembly with Targeted Volume Reduction

FIG. 6B shows various views of another grounding assembly 612, which is an example of the grounding assembly 122. As shown (left, (1)), the grounding assembly 612 is designed to wrap around a portion of a user's body (e.g., the user's index finger) and secure one or more user-feedback elements 124, in this example a haptic actuator 127, at a target location on the user's body. While not shown, the grounding assembly 612 may also be configured to secure the wearable structure 202 to the user's body. Securing user-feedback elements and wearable structures 202 to a user's body is discussed in further detail above with reference to FIGS. 5A-5B.

Like the grounding assembly 602, the grounding assembly 612 includes at least one bladder 204 configured to receive a fluid from the source 210. The grounding assembly 612 differs from the grounding assembly 602 in that the at least one bladder 204 in FIG. 6B is positioned only on the dorsal side of the user's finger, while the bladder 204 in FIG. 6A is wrapped around the user's finger. Like the bladder 204 in FIG. 6A, the bladder 204 in FIG. 6B includes an inelastic substrate 614 coupled to an elastic membrane 618 by an adhesive 616, and the inelastic substrate 614 includes an opening sized to receive a conduit 208. Notably, the inelastic substrate 614 includes extensions 619 (e.g., flaps, wings) configured to attach with a user-feedback element 124, in this case the haptic actuator 127. Thus, when pressurized by the source 210 and because the elastic membrane 618 is the portion of the bladder 204 that contacts the user's body, the elastic membrane 618 expands (e.g., bulges) and presses against the wearable structure 202 (not shown) and the portion of the user's body. Expansion of the elastic membrane 618 causes the extensions 619 to tighten and pull on the haptic actuator 127, thereby securing the haptic actuator 127 to the user's body. The bladder 204 shown in FIG. 6B is configured to operate in a similar way to the bladder 204 shown in FIG. 4C.

The middle (2) and right (3) views in FIG. 6B show different embodiments of the grounding assembly 612 attached to the user's hand. For ease of illustration and discussion, the wearable structure 202 is not shown in FIG. 6B. The middle view (2) shows a back of the user's hand while the right view (3) shows a palm of the user's hand. As shown, a first embodiment of the grounding assembly 612-A wraps around the user's middle finger and is configured to secure two haptic actuators (not shown) to the user's middle finger at separate target locations. In the first embodiment, a single bladder 204 is used to secure the two haptic actuators to the user's middle finger at the separate target locations. In this configuration, the single bladder 204 is fluidically coupled to the source 210 by a single conduit 208. As also shown, a second embodiment of the grounding assembly 612-B wraps around the user's index finger and is configured to secure two haptic actuators 127-A, 127-B to the user's index finger at separate target locations. In the second embodiment, two separate bladders 204-A, 204-B are used to secure the haptic actuators 127-A, 127-B to the user's index finger. In this alternative configuration, each bladder 204-A, 204-B is fluidically coupled to the source 210 by a distinct conduit 208. Again, the user-feedback element 124 is optional and the grounding assembly 612 is not limited to the configurations shown in FIG. 6B. For example, the grounding assembly 612 could be resized and attached to other portions of the user's body.

Third Embodiment—Grounding Assembly with Lateral Volume Reduction

Figure 6C:
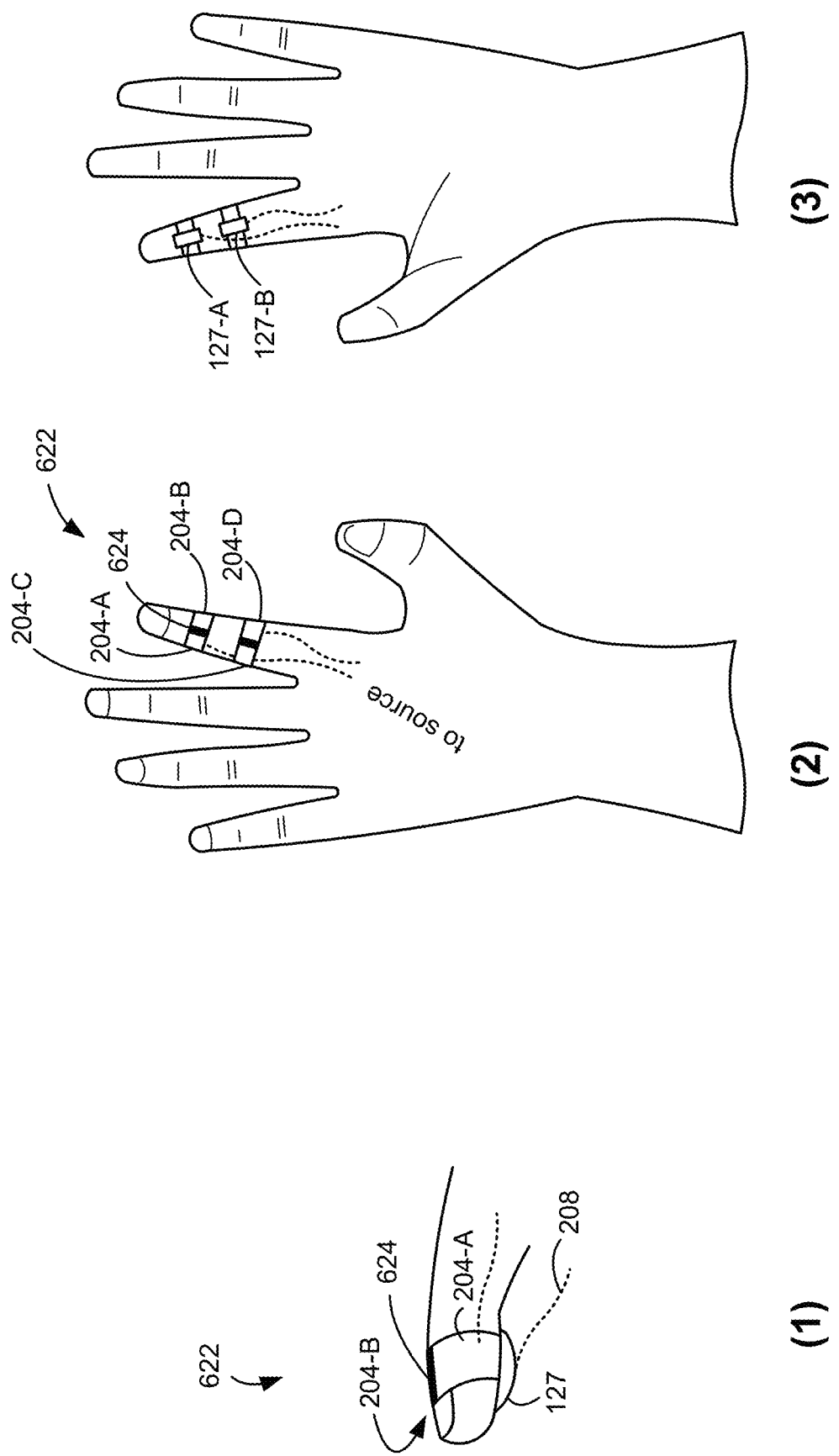
FIG. 6C shows various views of a grounding assembly that uses lateral volume reduction in accordance with some embodiments.
Figure 7A:
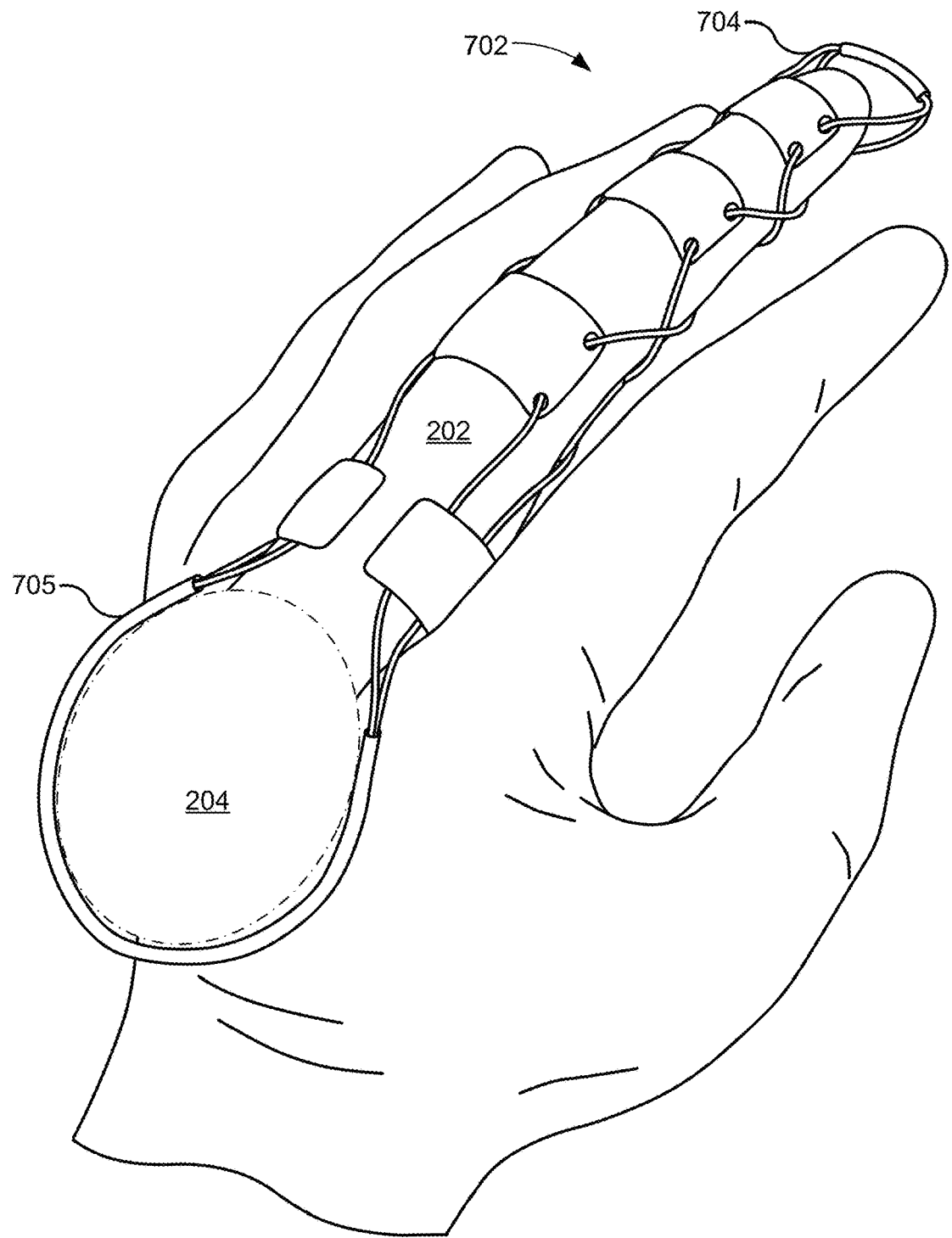
FIGS. 7A through 7C show various views of a grounding assembly with a tightening mechanism in accordance with some embodiments.
Figure 7B:
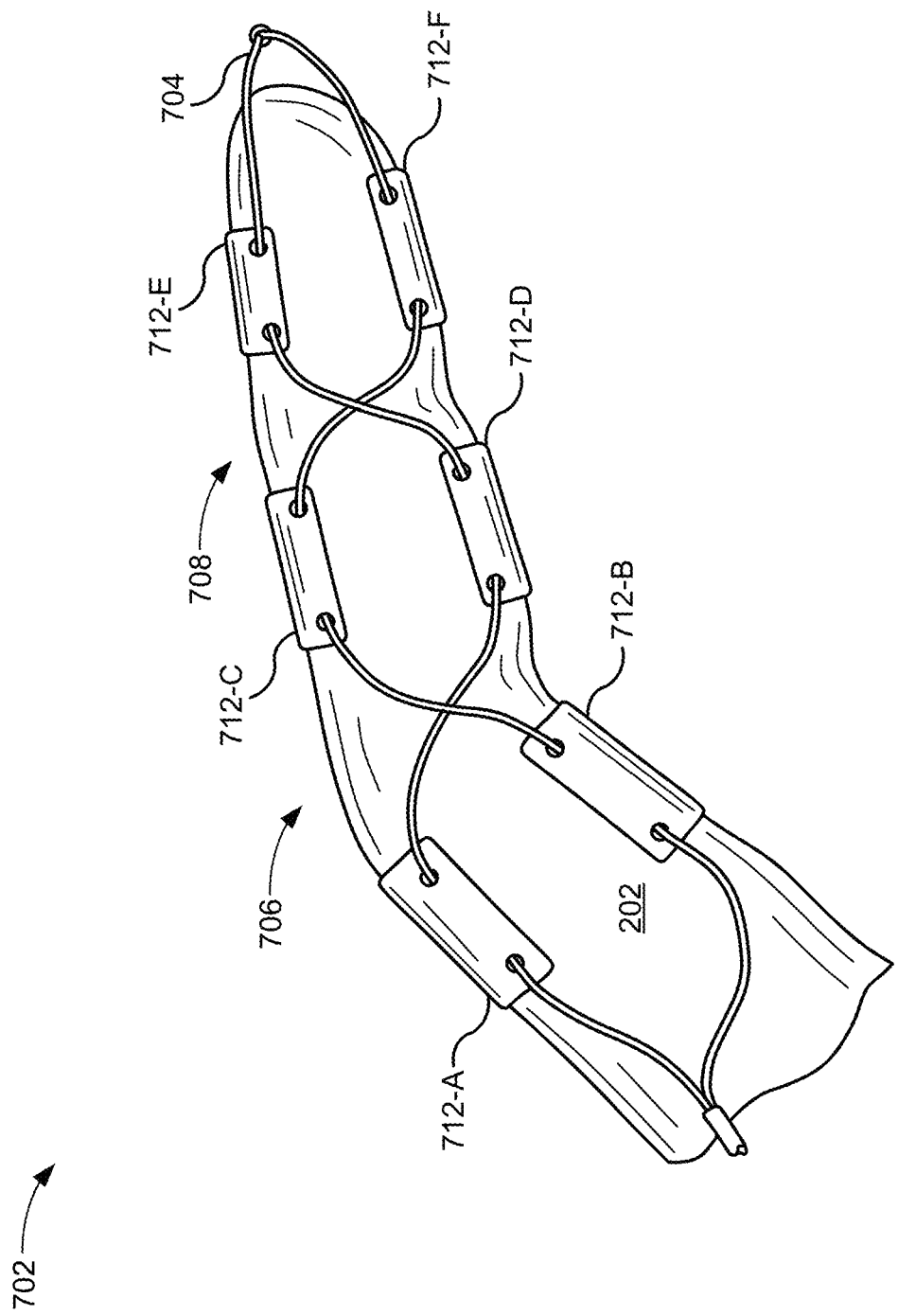
Figure 7C:
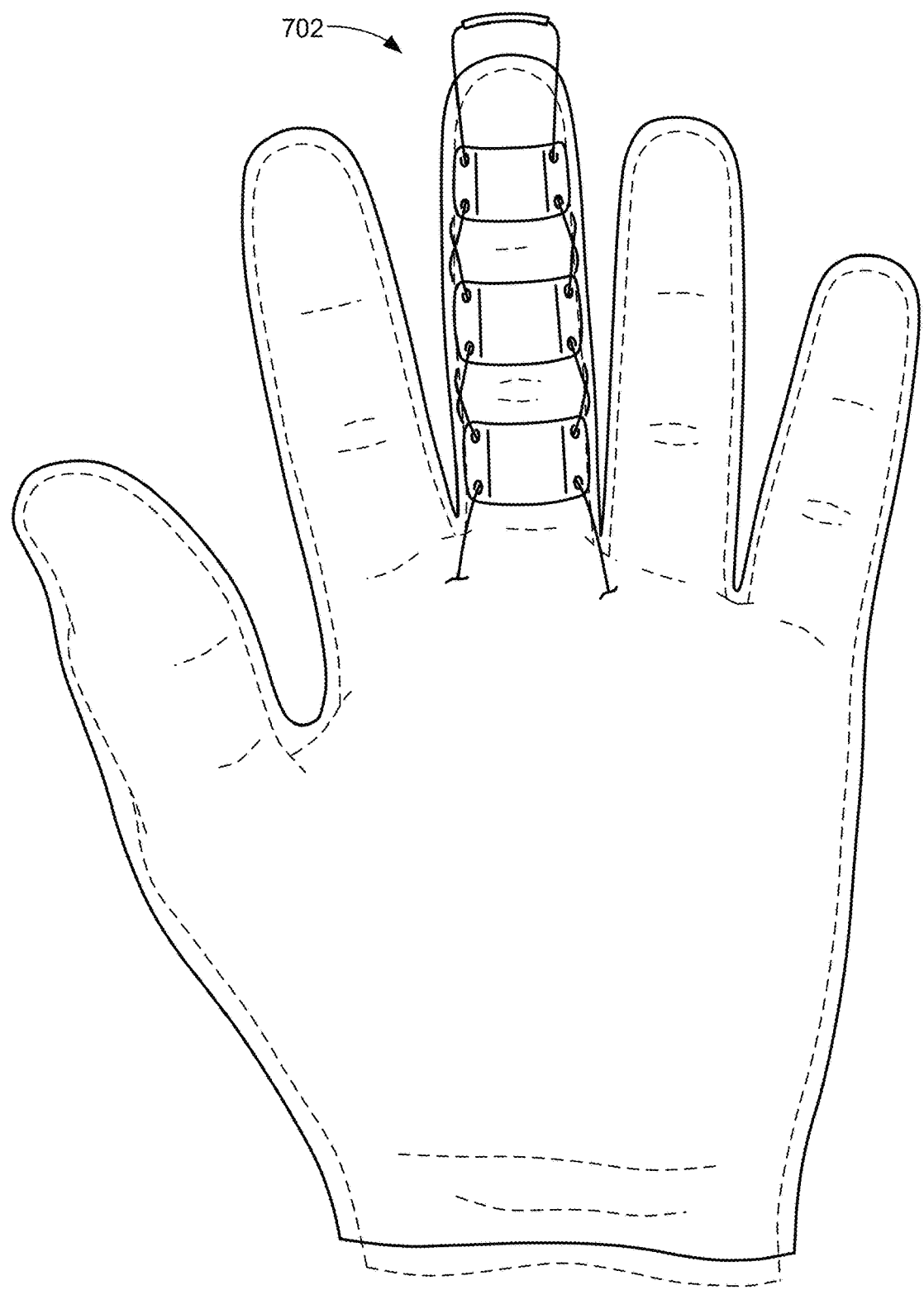

FIG. 6C shows various views of another grounding assembly 622, which is an example of the grounding assembly 122. As shown (left, (1)), the grounding assembly 622 is designed to wrap around a portion of a user's body (e.g., the user's index finger) and secure one or more user-feedback elements 124, in this example a haptic actuator 127, at a target location on the user's body. While not shown, the grounding assembly 622 may also be configured to secure the wearable structure 202 to the user's body, as shown in FIG. 3A. Securing user-feedback elements and wearable structures 202 to a user's body is discussed in further detail above with reference to FIGS. 5A-5B.

The grounding assembly 622 includes two bladders 204-A, 204-B configured to receive a fluid from the source 210. The grounding assembly 622 differs from the grounding assembly 602 in that the two bladders 204-A, 204-B in FIG. 6C are positioned on lateral sides of the user's finger (while not shown, the bladder 204-B is arranged in a similar fashion to the bladder 204-A on the opposing side of the user's finger). Like the bladder 204 of FIG. 6A, each bladder 204 in FIG. 6C includes an inelastic substrate coupled to an elastic membrane by an adhesive, whereby the inelastic substrate includes an opening sized to receive a conduit 208. Notably, respective ends of the inelastic substrates in each bladder 204-A, 204-B are bonded together, forming a seam 624. Like above, in the grounding assembly 622, the elastic membrane is the portion of the each bladder that contacts the user's body. Thus, when pressurized by the source 210, the elastic membrane in each bladder 204 expands and presses against the wearable structure 202 (not shown) and the portion of the user's body. Expansion of the elastic membranes in each bladder 204 causes the inelastic substrates to bow outwards and pull on the haptic actuator 127, thereby securing the haptic actuator 127 to the user's body. The bladder 204 shown in FIG. 6C is configured to operate in a similar way to the bladder 204 shown in FIG. 4D.

The middle (2) and right (3) views in FIG. 6C show the grounding assembly 622 attached to the user's hand. In this example, the grounding assembly 622 includes four bladders 204-A-204-D (note that the grounding assembly 622 could include more than four bladders 204). For ease of illustration and discussion, the wearable structure 202 is not shown in FIG. 6C. The middle view (2) shows a back of the user's hand while the right view (3) shows a palm of the user's hand. As shown, a set of bladders 204 wraps around different portions of the user's index finger, and each secures a respective haptic actuator 127 to the user's index finger at separate target locations. In some embodiments (as shown), the two bladders 204-A, 204-B in the grounding assembly 622 are fluidically coupled to the source 210 by a single conduit 208. In such embodiments, the grounding assembly 622 includes a channel connecting the two bladders 204-A, 204-B. In some other embodiments, the two bladders 204-A, 204-B in the grounding assembly 622 are fluidically coupled to the source 210 by separate conduits 208 (note that the discussion above applies equally to the bladders 204-C and 204-D). It is noted that this grounding assembly 622 can accommodate various user-feedback elements 124, and the positioning of the user-feedback element (or elements) 124 is not limited to the positioning of the actuator 127 shown in FIG. 6C. Again, the user-feedback element 124 is optional and the grounding assembly 622 is not limited to the configurations shown in FIG. 6C. For example, the grounding assembly 622 could be resized and attached to other portions of the user's body.

Fourth Embodiment—Grounding Assembly with Built-In Channels

Figures 1, 6D:
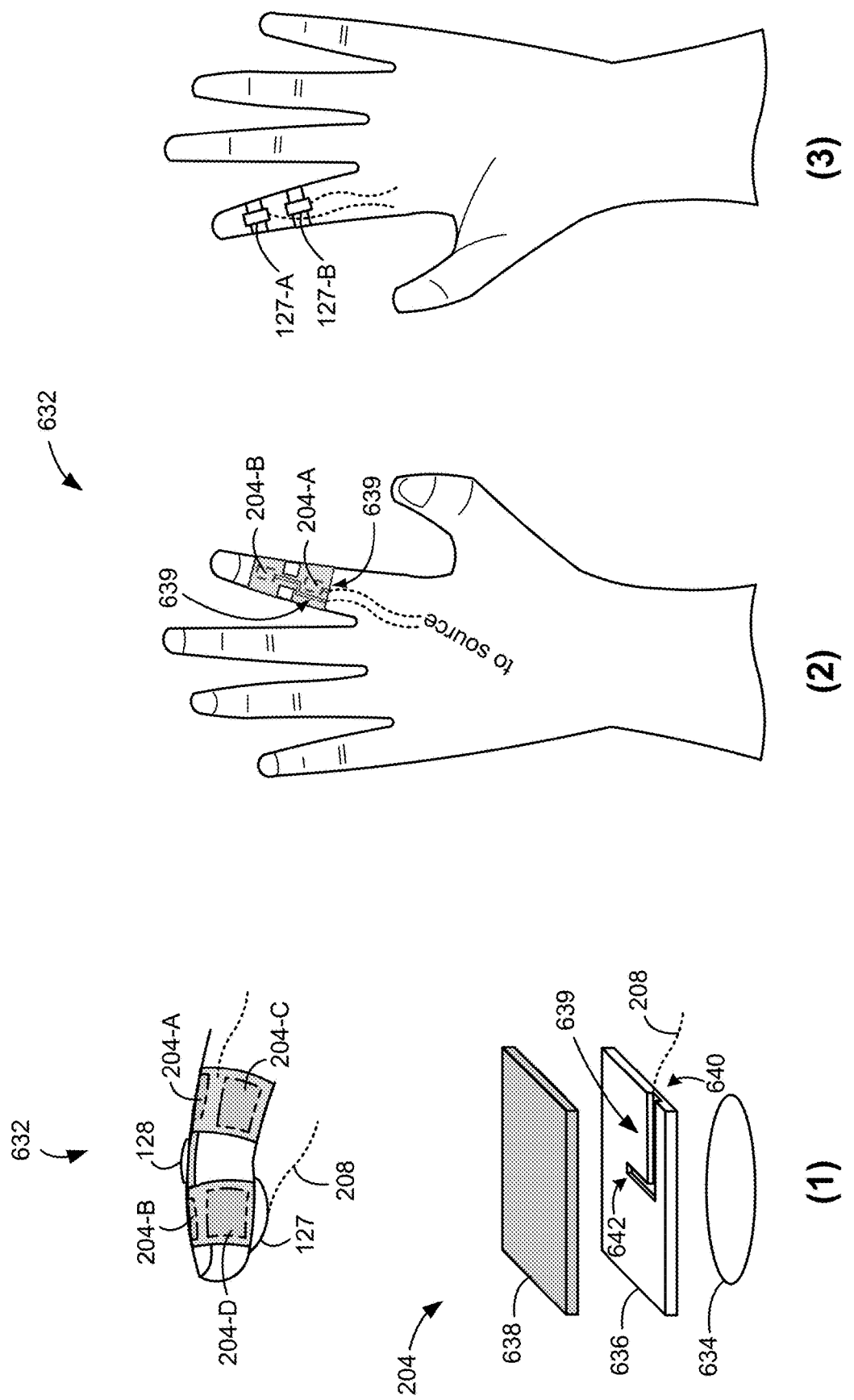
Figures 2, 6D:
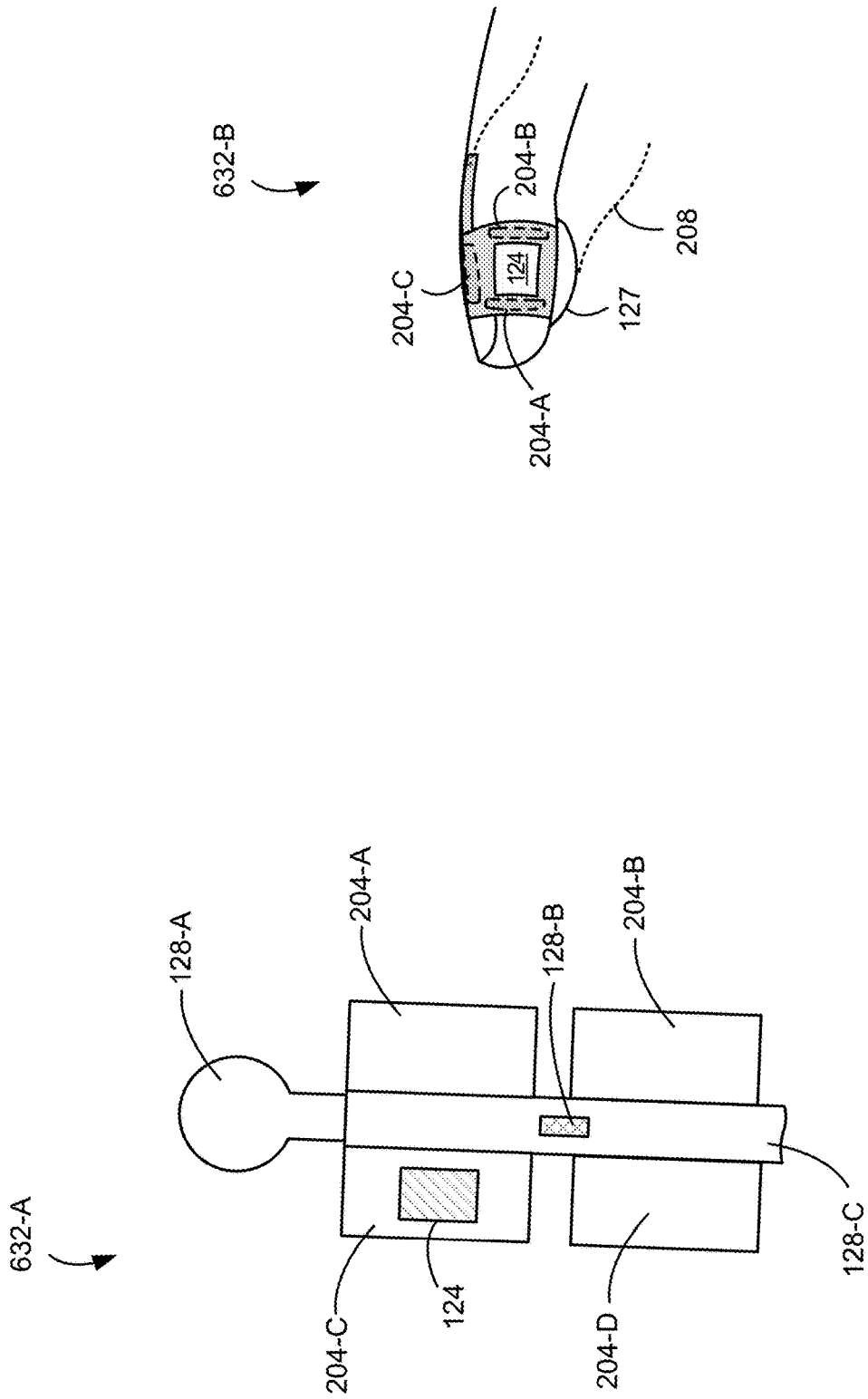

FIG. 6D-1 shows various views of another grounding assembly 632, which is an example of the grounding assembly 122. As shown (left, (1)), the grounding assembly 632 is designed to wrap around a portion of a user's body (e.g., the user's index finger) and secure one or more user-feedback elements 124, in this example a haptic actuator 127, at a target location on the user's body. While not shown, the grounding assembly 632 may also be configured to secure the wearable structure 202 to the user's body. Securing user-feedback elements and wearable structures 202 to a user's body is discussed in further detail above with reference to FIGS. 5A-5B.

The grounding assembly 632 includes one or more bladders 204, each of which is configured to receive a fluid from the source 210. In the illustrated embodiment, the grounding assembly 632 includes four bladders 204-A-204-D. Furthermore, the grounding assembly 632 is shown as securing two user-feedback elements to the user's body: an actuator 127 to a palmar side of the user's finger and a sensor 128 to a dorsal side of the user's finger. While not shown in the side view of the user's index finger (left), in some embodiments, the one or more bladders 204 are interconnected by one or more channels 639 such that each bladder is serviced by a single conduit 208 (i.e., the one or more channels 639 terminate at a single location and are connected to the single conduit 208 at that single location). Alternatively, in some embodiments, at least one of the one or more bladders 204 is not interconnected with the other bladders such that the bladders 204 are serviced by at least two separate conduits 208. In such embodiments, multiple channels 639 may service the one or more bladders 204.

The bladder 204 in FIG. 6D-1 includes an inelastic substrate 638 coupled to a first surface of a channeled substrate 636 (e.g., a silicone substrate) and an elastic membrane 634 coupled to a second surface of the channeled substrate 636. The elastic substrate 636 defines at least one channel 639 with an inlet 640 and an outlet 642, whereby the channel 639 is designed to transport a fluid from the source 210 through the inlet 640 to the outlet 642. Notably, the fluid exits the channel 639 via the outlet 642 and inflates the elastic membrane 634 after exiting. The inelastic substrate 638 is sealed against the channeled substrate 636 such that fluid in the channel 639 can only enter and exit the channel 639 by the inlet 640 and the outlet 642. Accordingly, the grounding assembly 632 uses integral channels (e.g., channel 639) to transport a fluid, which reduces the use of conduits 208 in the grounding assembly 632.

The middle (2) and right (3) views in FIG. 6D-1 show different embodiments of the grounding assembly 632 attached to the user's hand. For ease of illustration and discussion, the wearable structure 202 is not shown in FIG. 6D-1. The middle view (2) shows a back of the user's hand while the right view (3) shows a palm of the user's hand. As shown, the grounding assembly 632 wraps around the user's index finger and is configured to secure a respective haptic actuator 127 to the user's index finger at separate target locations. In some embodiments (as shown), the bladders 204-A, 204-B of the grounding assembly 632 are fluidically coupled to the source 210 by separate conduits 208. In some other embodiments, the bladders 204-A, 204-B of the grounding assembly 632 are fluidically coupled to the source 210 by the same conduit 208. Of importance here, the grounding assembly 632 defines distinct channels 639 that service the two bladders 204-A, 204-B, whereby each channel terminates near the base of the user's finger. In this arrangement, the conduits 208 (or conduit 208) need only extend to the base of the user's finger, meaning that a conduit 208 does not have to extend to the distal phalange of the user's finger. Again, the user-feedback element 124 is optional and the grounding assembly 632 is not limited to the configurations shown in FIG. 6D-1. For example, the grounding assembly 632 could be resized and attached to other portions of the user's body.

The arrangement of bladders 204 and user-feedback elements 124 in FIG. 6D-1 is merely one possible arrangement/design of the grounding assembly 632. For example, FIG. 6D-2 shows two alternative designs of the grounding assembly 632. In the first alternative design (left), the grounding assembly 632-A includes four bladders 204-A-204-D that are configured to wrap around the user's finger (or some other portion of the body), in a manner similar to the grounding assembly 632. The grounding assembly 632-A also includes a plurality of sensors 128. Sensor 128-A may be a capacitive sensor that measures contact with the user's body. The measurements from the sensor 128-A may indicate how well the grounding assembly 632-A is secured to the user's body. The sensor 128-B may be a motion sensor, such as an IMU. As explained above with reference to FIG. 1, IMUs provide feedback regarding the user's movements/motions. Sensor 128-C may be a bend sensor that measures a curl of the user's finger. Like the sensor 128-B, measurements from the sensor 128-C may provide feedback regarding the user's movements/motions. Lastly, user-feedback element 124 may be another sensor 128, a haptic actuator 127, or some other type of user-feedback element, such as an electrode. While not shown, the grounding assembly 632-A includes one or more channels 639 connected to the four bladders 204-A-204-D.

In the second alternative design (right), the grounding assembly 632-B includes a plurality of bladders 204-A-204-C that surround one or more user-feedback elements 124. Again, while not shown, the grounding assembly 632-B includes one or more channels 639 connected to the bladders 204-A-204-C.

Fifth Embodiment—Grounding Assembly with Web Structure

Figure 6E:
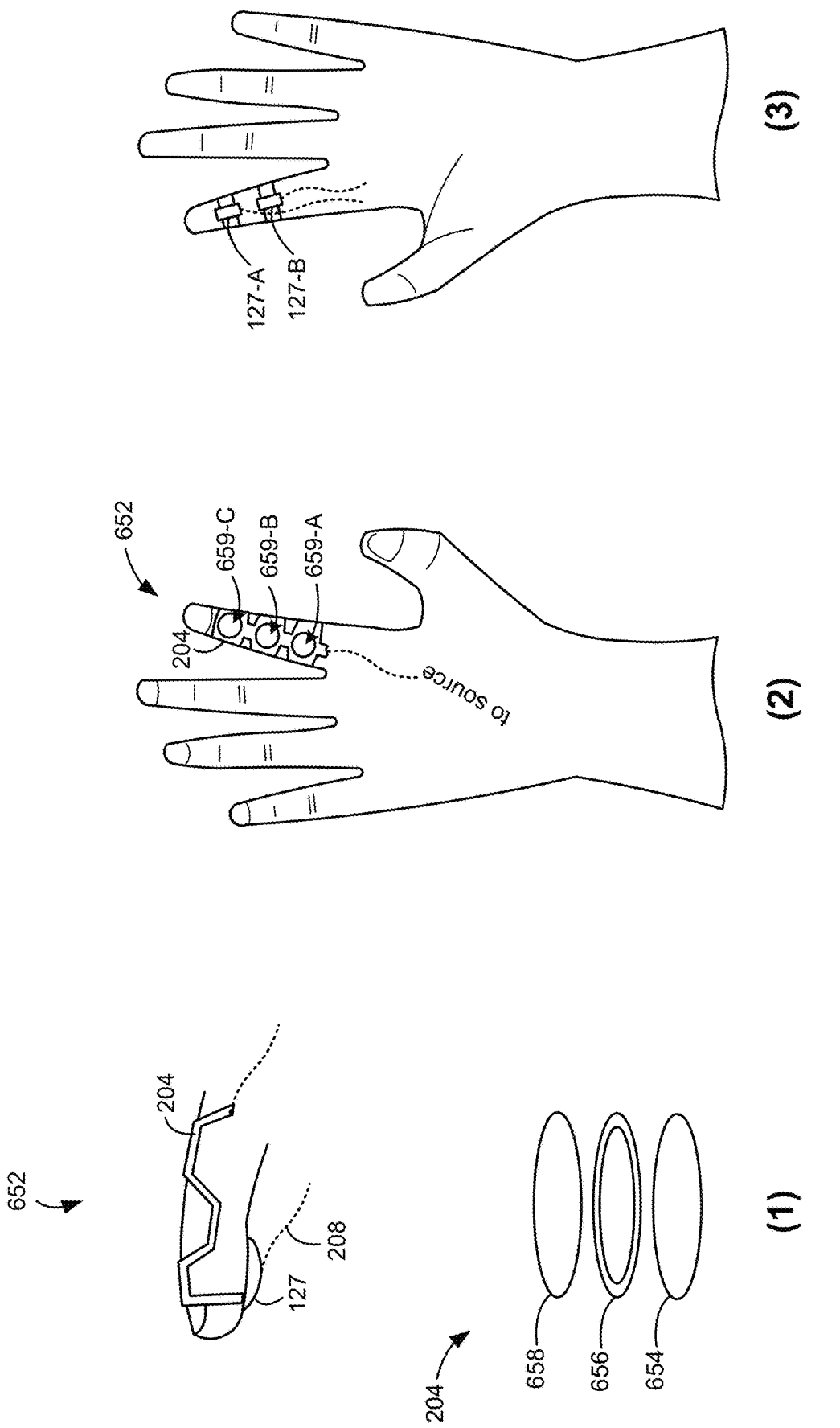
FIGS. 6E and 6F show various views of a grounding assembly with a web-like structure in accordance with some embodiments.
Figure 6F:
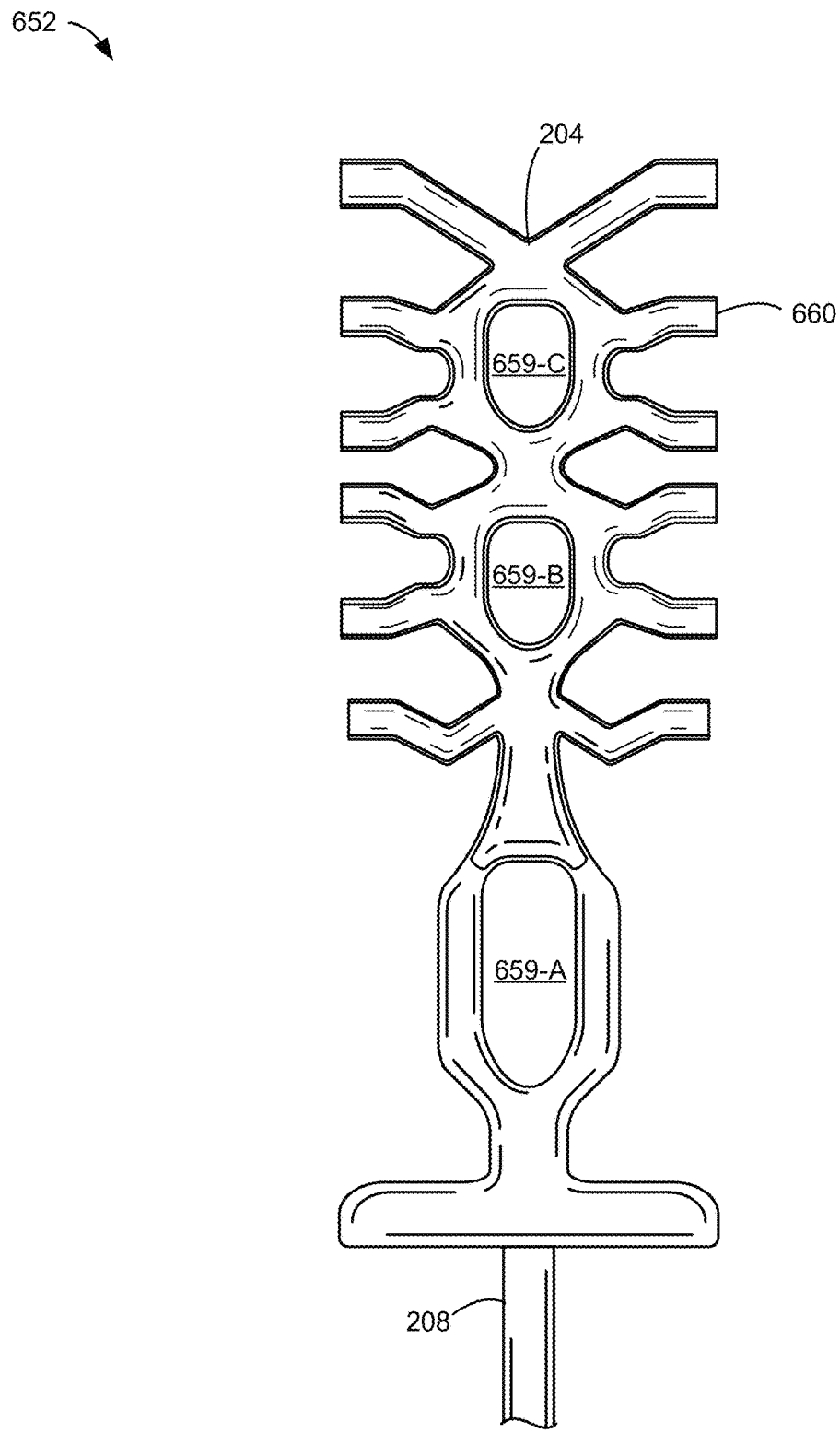

FIGS. 6E-6F show various views of yet another grounding assembly 652, which is an example of the grounding assembly 122. As shown (left, (1)), the grounding assembly 652 is designed to wrap partially around a portion of a user's body (e.g., the user's index finger) and secure one or more user-feedback elements 124, in this example a haptic actuator 127, at a target location on the user's body. While not shown, the grounding assembly 652 may also be configured to secure the wearable structure 202 to the user's body. Securing user-feedback elements and wearable structures 202 to a user's body is discussed in further detail above with reference to FIGS. 5A-5B.

The grounding assembly 652 includes at least one bladder 204 configured to receive a fluid from the source 210. As shown, the bladder 204 includes an inelastic substrate 654 coupled to an elastic membrane 658. In some embodiments (as shown), the inelastic substrate 654 is coupled to the elastic membrane 658 by an adhesive 656. In some other embodiments, the inelastic substrate 654 and the elastic membrane 658 are bonded together (e.g., along their respective perimeters) by other means (e.g., using various welding techniques). Like previous embodiments, the elastic membrane 658 is the portion of the bladder 204 that contacts the user's body, and because the inelastic substrate 654 in less elastic than the elastic membrane 658, when pressurized by the source 210, the elastic membrane 658 expands (e.g., bulges) and presses against the wearable structure 202 (not shown) and the portion of the user's body. In some embodiments, the inelastic substrate 654 is flexible circuitry. In some other embodiments, the inelastic substrate 654 is an inelastic textile (e.g., nylon), such as the textile 402 (discussed above).

The middle (2) and right (3) views in FIG. 6E show the grounding assembly 652 attached to the user's hand. For ease of illustration and discussion, the wearable structure 202 is not shown in FIG. 6E. The middle view (2) shows a back of the user's hand while the right view (3) shows a palm of the user's hand. As shown, the grounding assembly 652 wraps around the user's index finger and is configured to secure multiple haptic actuators 127 to the user's index finger at separate target locations. The bladder 204 of the grounding assembly 652 can be designed to reduce encumbrances experienced by the user. Put another way, the web-like structure of the bladder 204 is designed based on characteristics of the user's body (e.g., the bladder 204 is shaped to accommodate movement of joints of the user). For example, in the illustrated embodiment, the bladder 204 includes openings 659-A-659-C (also shown in FIG. 6F) that are sized for the user's knuckles on his or her index finger. It is noted that the grounding assembly 652 is not limited to the configurations shown in FIG. 6E. For example, the grounding assembly 652 could be resized and attached to other portions of the user's body.

FIG. 6F shows one example of the web-like structure of the bladder 204 in the grounding assembly 652. As shown, the bladder 204 includes extensions 660 (e.g., flaps, wings) that are designed to (i) secure the wearable structure 202 to the user's body and/or (ii) secure one or more user-feedback elements 124 to the user's body at specific target locations. In some embodiments, the one or more user-feedback elements 124 are one or more haptic actuators 127 that are configured to impart haptic stimulations onto a portion of the user's body, e.g., as shown in FIG. 6E. Alternatively or in addition, the one or more user-feedback elements 124 are one or more sensors 128 that are configured to take various measurements, such as physiological measures of the user (e.g., heartbeat, blood pressure, etc.), pressure/force measurements between the user's body and the grounding assembly 652, and positional measurements of the user's body (e.g., degree at which the user is curling his or her finger).

In some embodiments, the bladder 204 is laser welded to achieved its web-like structure. Alternatively, the bladder 204 is made using a die-cutting process. Various other manufacturing techniques may also be used to create the bladder 204 in FIGS. 6E-6F.

In some embodiments, a number of extensions 660 included in the grounding assembly 652 can be adjusted depending on a number of user-feedback elements 124 be secured to the user's body. Additionally, a size and shape of the extensions 660 may also be adjusted depending on a shape/size of the user-feedback elements 124 to be secured to the user's body. For example, if a greater number of smaller user-feedback elements 124 are to be secured to the user's body, then the grounding assembly 652 may include a greater number of extensions 660 than the number shown in FIG. 6F. Furthermore, the extensions 660 themselves may be thinner so that more extensions 660 can be included in the grounding assembly 652.

Sixth Embodiment—Grounding Assembly with Individually Addressable Zones

Figure 6G:
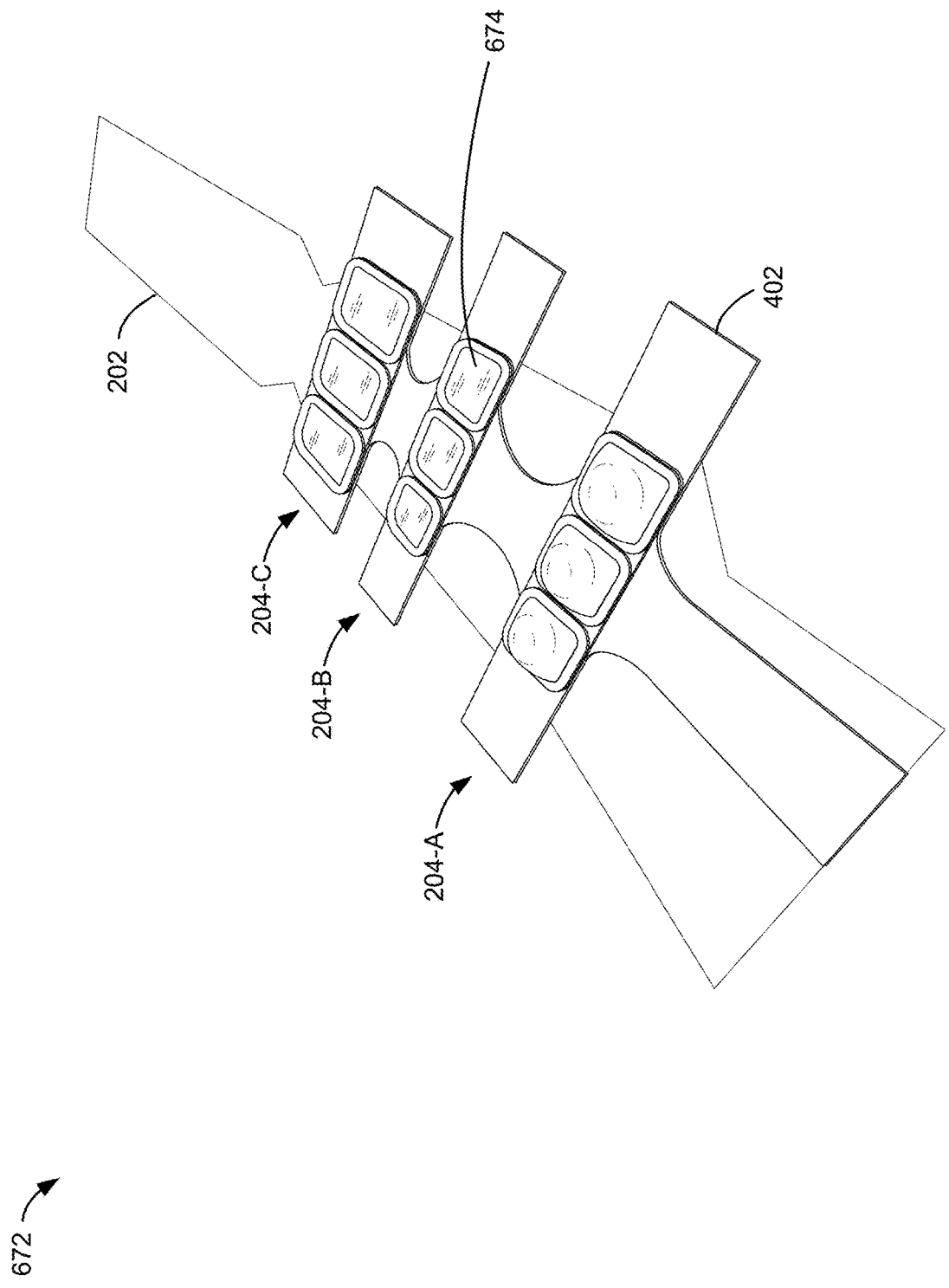
FIG. 6G shows various views of a grounding assembly with individually addressable pockets in accordance with some embodiments.

FIG. 6G shows yet another grounding assembly 672, which is an example of the grounding assembly 122. The grounding assembly 672 is designed to wrap around a portion of a user's body (e.g., the user's index finger) and, while not shown, the grounding assembly 602 may also be configured to secure the wearable structure 202 and/or one or more user-feedback elements 124 to the user's body. Securing user-feedback elements and wearable structures 202 to a user's body is discussed in further detail above with reference to FIGS. 5A-5B.

The grounding assembly 672 includes a plurality of bladders 204-A-204-C, each of which is configured to receive a fluid from the source 210. The grounding assembly 672 also includes a textile 402 that surrounds the plurality of bladders 204. In this embodiment, each of the plurality of bladders 204-A-204-C includes multiple zones 674 (i.e., individually addressable sub-bladders), and a pressure inside each zone 674 of the multiple zones 674 can be independently controlled (e.g., by controller 214, FIG. 2). In some embodiments, multiple zones 674 are controlled according to a known impedance (e.g., a body-tissue impedance) of the portion of the user's body. For example, different portions of a user's finger will have different impedances. Because of this, the controller 214 may inflate the multiple zones 674 to different pressures based on those different impedances. Thus, the grounding assembly 672 is designed to tailor the forces applied to the user's body according to the characteristics of the user's body.

While not shown in FIG. 6G, in some embodiments, the grounding assembly 672 may include one or more sensors 128 to measure impedances of the user's body. Accordingly, when a first portion of the user's body (e.g., the distal phalange of a finger) has first impedances, the multiple zones 674 of the bladder 204-C may be pressurized to a first set of pressures to secure a first user-interacting element 124 at a first target location. Further, when a second portion of the user's body (e.g., the intermediate phalange of the finger) has second impedances different from the first impedance, the multiple zones of the bladder 204-B may be pressurized to a second set of pressures, different from the first set of pressures, to secure a second user-interacting element 124 at a second target location (and so on).

To provide some context, in the illustrated embodiment, sub-bladders 674 of the bladder 204-A are inflated while sub-bladders 674 of the bladder 204-B and bladder 204-C are not inflated. It is noted that while each sub-bladder 674 in the bladder 204-A is shown as inflated, in other embodiments, at least one sub-bladder 674 is not inflated while the other sub-bladders 674 are inflated (or vice versa).

Seventh Embodiment—Grounding Assembly with Tightening Mechanism

FIGS. 7A-7C show yet another grounding assembly 702, which is an example of the grounding assembly 122. The grounding assembly 702 includes (i) a bladder 204, coupled to a first portion of the wearable structure 202, that is configured to receive a fluid from a source, and (ii) a tightening mechanism 704 (e.g., cord, wire, string, or the like) coupled to a second portion of the wearable structure and the inflatable bladder. The tightening mechanism 704 is configured to tighten around a portion of the user's body (e.g., the user's middle finger as shown in FIG. 7A) according to, and in proportion with, a fluid pressure inside the bladder 204.

While not shown (for ease of illustration), the bladder 204 of the grounding assembly 702 would be coupled to a back side of the user's hand (i.e., the bladder 204 is integrated with the wearable structure 202 and positioned on the back of the user's hand). Furthermore, a first portion 705 of the tightening mechanism 704 is designed to wrap partially around the bladder 204 (as shown) while a second portion of the tightening mechanism 704 is designed to wrap around the user's finger (e.g., the tightening mechanism 704 is laced around the user finger). In this arrangement, when the bladder 204 expands, a length of the first portion 705 of the tightening mechanism 704 increases while a length of the second portion of the tightening mechanism 704 decreases. In doing so, the second portion of the tightening mechanism 704 cinches (i.e., tightens) onto the user's finger (e.g., in a similar manner as a corset being tightened). Put another way, the bladder 204 is configured to pull the tightening mechanism 704 in a direction when the fluid pressure inside the bladder 204 satisfies a threshold pressure, thereby causing the tightening mechanism 704 to tighten around the portion of the user's body. With the tightening mechanism 704 in its tightened state, the tightening mechanism 704 secures the wearable structure 202 to the portion of the user's body (e.g., secures the wearable structure 202 to the user's middle finger).

In some embodiments, the grounding assembly 702 is further configured to secure a plurality of user-feedback elements 124 to the user's body. For example, the grounding assembly 702 may be configured to secure at least one actuator (e.g., actuator 127) to the user (and/or at least one sensor 128). In particular, the wearable device 120 may include at least one actuator, coupled to the wearable structure 202, that is configured to impart a haptic stimulation to the user at a target location. In such instances, the tightening mechanism 704 is further configured to secure (i.e., ground, fix) the at least one actuator to the user at the target location (e.g., target location 404, FIG. 5A) when tightened around the portion of the user's body (i.e., when the bladder 204 is inflated). For example, when the bladder 204 is not inflated and the tightening mechanism 704 is not tightened around the portion of the user's body, the at least one actuator is prone to shifting/moving away from the target location, because the only material holding the at least one actuator in place is the wearable structure 202, which is somewhat flexible when unencumbered. However, when the bladder 204 is inflated, the tightening mechanism 704 tightens around the portion of the user's body and pulls the wearable structure 202 taut, which prevents the at least one actuator from shifting or otherwise moving.

The tightening mechanism 704 may be coupled to the second portion of the wearable structure 202 in a variety of ways. In the illustrated embodiment, the tightening mechanism 704 is woven (i.e., wound) around the user's index finger in a predefined pattern, crisscrossing between the palmar and dorsal sides of the user's finger. In other embodiments, the tightening mechanism 702 crisscrosses along an upper side of the user's body or along a lower side of the user's body. For example, the tightening mechanism 704 in FIG. 7A could be modified so that the crisscrossing pattern is limited to the dorsal side of the user's finger. In this arrangement, when the bladder 204 is inflated, the tightening mechanism 704 tightens and pulls the wearable structure 202 such that the wearable structure 202 along the palmar side of the user's finger becomes taut. In this way, a user-feedback element 124 coupled to the wearable structure 202 and positioned on the palmar side of the user's finger is prevented from shifting or otherwise moving.

In some embodiments, the portion of the user's body includes one or more joints. In such embodiments, the tightening mechanism 704 is woven around the portion of the user's body so as to not encumber the one or more joints of that portion of the user's body. For example, with reference to FIG. 7B, the user's finger includes multiple joints 706, 708. As shown, the tightening mechanism 704 is designed to not encumber the multiple joints 706, 708 of the user's finger.

In some embodiments, the grounding assembly 702 includes a plurality of brackets 712 coupled to the wearable structure 202, as an example of which is shown in FIG. 7B (e.g., brackets 712-A-712-F are coupled to the wearable structure 202). In such embodiments, the tightening mechanism 704 is fed through the plurality of brackets 712 to form a crisscrossing pattern. In those embodiments where the tightening mechanism 704 is woven around the user's finger (i.e., crisscrosses between the palmar and dorsal sides of the user's finger), one or more first brackets of the plurality of brackets are positioned on a palmar side of the user's finger (e.g., brackets 712-B, 712-D, and 712-F in FIG. 7B) and one or more second brackets of the plurality of brackets are positioned on a dorsal side of the user's finger (e.g., brackets 712-A, 712-C, and 712-E in FIG. 7B). In this arrangement, the crisscrossing pattern of the tightening mechanism 704 alternates between the one or more first brackets and the one or more second brackets, as shown in FIG. 7B. The arrangement of the plurality of brackets 712 in FIG. 7B is merely one example arrangement, and various other arrangements can be used depending on the portion of the user's body and the desired strain to be imparted onto the wearable structure 202.

FIG. 7C show another view of the grounding assembly 702 on the user. In particular, FIG. 7C shows the palmar side of the user's hand. In some embodiments, the bladder 204 is coupled to the palmar side of the user's hand instead of the dorsal side of the user's hand. In such embodiments, the first portion 705 of the tightening mechanism 704 would also be positioned adjacent to the palmar side of the user's hand.

In some embodiments, the bladder 204 in the grounding assembly 702 is replaced with a motor that is configured to wind and unwind the tightening mechanism 704. In some embodiments, the motor is electrically powered. In such embodiments, the wearable device 120 may include a power source to power the motor. In some other embodiments, the motor is pneumatically driven. In such embodiments, the source 210 may be used to power the motor (or some other pressure source may be used). In some embodiments, the motor is coupled to a portion of the wearable device 120, while in other embodiments the motor is positioned elsewhere on the user.

Methods of Operation

Figure 8:
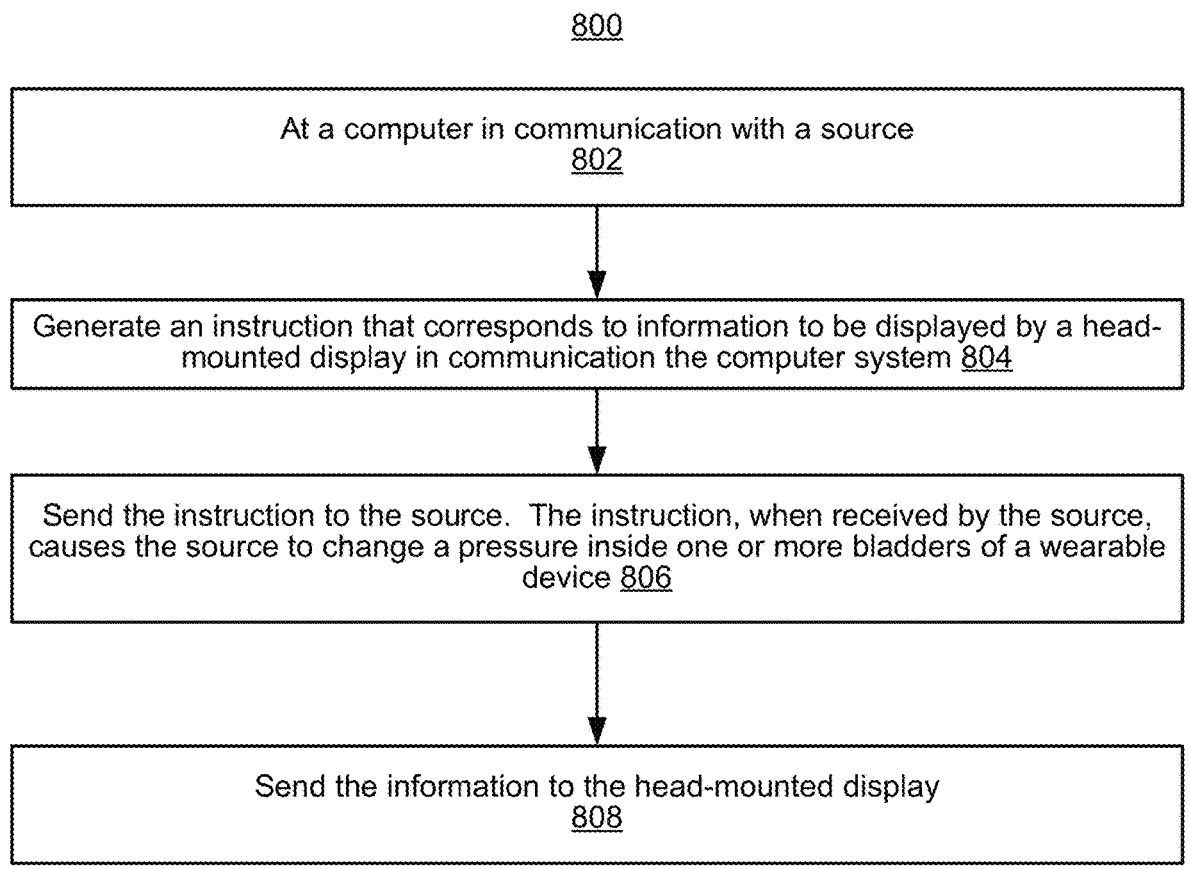
FIG. 8 is a flowchart for a method of controlling a grounding assembly in accordance with some embodiments.

FIG. 8 is a flow diagram illustrating a method 800 of managing creation of grounding forces in accordance with some embodiments. The steps of the method 800 may be performed by a computer (e.g., computer system 130, FIG. 1) (802). FIG. 8 corresponds to instructions stored in a computer memory or computer readable storage medium (e.g., memory of the computer system 130). For example, the operations of method 800 are performed, at least in part, by a communication interface 136 and an artificial-reality generation module (e.g., part of engine 134, FIG. 1). It is noted that the method 800 described below can be implemented with any of the wearable devices and grounding assemblies discussed above.

In some embodiments, the method 800 includes generating (804) an instruction that corresponds to information to be displayed by a head-mounted display in communication with the computer system (and/or corresponds to information received from one or more sensors 128 of the wearable device 120 and/or information received from one or more sensors 114 of the head-mounted display 110). Alternatively or in addition, in some embodiments, the computer system generates the instruction based on information received from the sensors on the wearable device. For example, the information received from the sensors may indicate that a user has donned (or doffed) the wearable device. In another example, the information received from the sensors may indicate that the user is making a first (or some other recognizable body movement). Alternatively or in addition, in some embodiments, the computer system generates the instruction based on information received from the sensors on the head-mounted display. For example, cameras (or other sensors) on the head-mounted display may capture movements of the wearable device, and the computer system can use this information when generating the instruction.

The method 800 further includes sending (806) the instruction to a source (e.g., source 210) in communication with the computer system (e.g., send the instruction in a communication signal from a communication interface). The instruction, when received by the source, causes the source to change a state of a grounding assembly of the wearable device (i.e., change a pressure inside one or more bladders of the grounding assembly). In doing so, a user/wearer of the wearable device will experience a stimulation that corresponds to the information gathered in step 804. To illustrate, in the example above, where the information received from the sensors indicates that the user has donned the wearable device, the user may experience a stimulation of one or more grounding assemblies incorporated in the wearable device tightening around one or more portions of the user's body. The tightening in the case is a somewhat subtle force that secures the wearable device (or more particularly, a wearable structure 202 of the wearable device and/or one or more user-feedback elements 124 of the wearable device) to the user. In other examples, the tightening is less subtle and is used in those situations where a substantial force is needed to secure the wearable structure 202 and/or one or more user-feedback elements 124 to the user. This substantial force may be needed when a haptic actuator 127 is about to impart a haptic stimulation to the user, as the substantial force helps to couple/secure the haptic actuator 127 to the user at a target location (i.e., so that forces generated by the haptic actuator 127 are effectively transferred to the user's body).

In some embodiments, sending the instruction to the source includes (i) sending a first instruction to the source at a first time that, when received by the source, causes the source to pressurize one or more bladders of the grounding assembly to a first pressure, and (ii) sending a second instruction to the source at a second time (after the first time) that, when received by the source, causes the source to pressurize the one or more bladders of the grounding assembly to a second pressure that is greater than the first pressure. In such embodiments, the first instruction may be generated in response to receiving information from the sensors indicating that the user has donned the wearable device. In this case, the one or more bladders of the haptic assembly, when pressurized to the first pressure, apply subtle force that secures the wearable device to the user's body. The second instruction, in contrast, may be generated when a substantial force is needed to secure the wearable structure 202 and/or one or more user-feedback elements 124 to the user. In this case, the one or more bladders of the haptic assembly, when pressurized to the second pressure, apply a substantial force to the user's body.

In some embodiments, the instruction specifies the change in the pressure to be made by the source. It is noted that in some situations, instead of the computer system sending the instruction to the source, the computer system sends the instruction to the wearable device. In response to receiving the instruction, the wearable device sends the instruction to the source. The source is discussed in further detail above with reference to FIG. 2.

After (or while, or before) sending the instruction, the method 800 may include sending (808) data to the head-mounted display for the information to be displayed by the head-mounted display. For example, the head-mounted display may receive visual data from the computer system, and may in turn display the visual data on its display(s). As an example, if the computer system receives information from the sensors 128 of the wearable device 120 that the user has closed his fingers around a position corresponding to a coffee mug in the virtual environment and raised his hand, a simulated hand in an artificial-reality application picks up the virtual coffee mug and lifts it to a corresponding height. Generating and sending visual data is discussed in further detail above with reference to FIG. 1.

Passive Grounding Assemblies

Figure 9A:
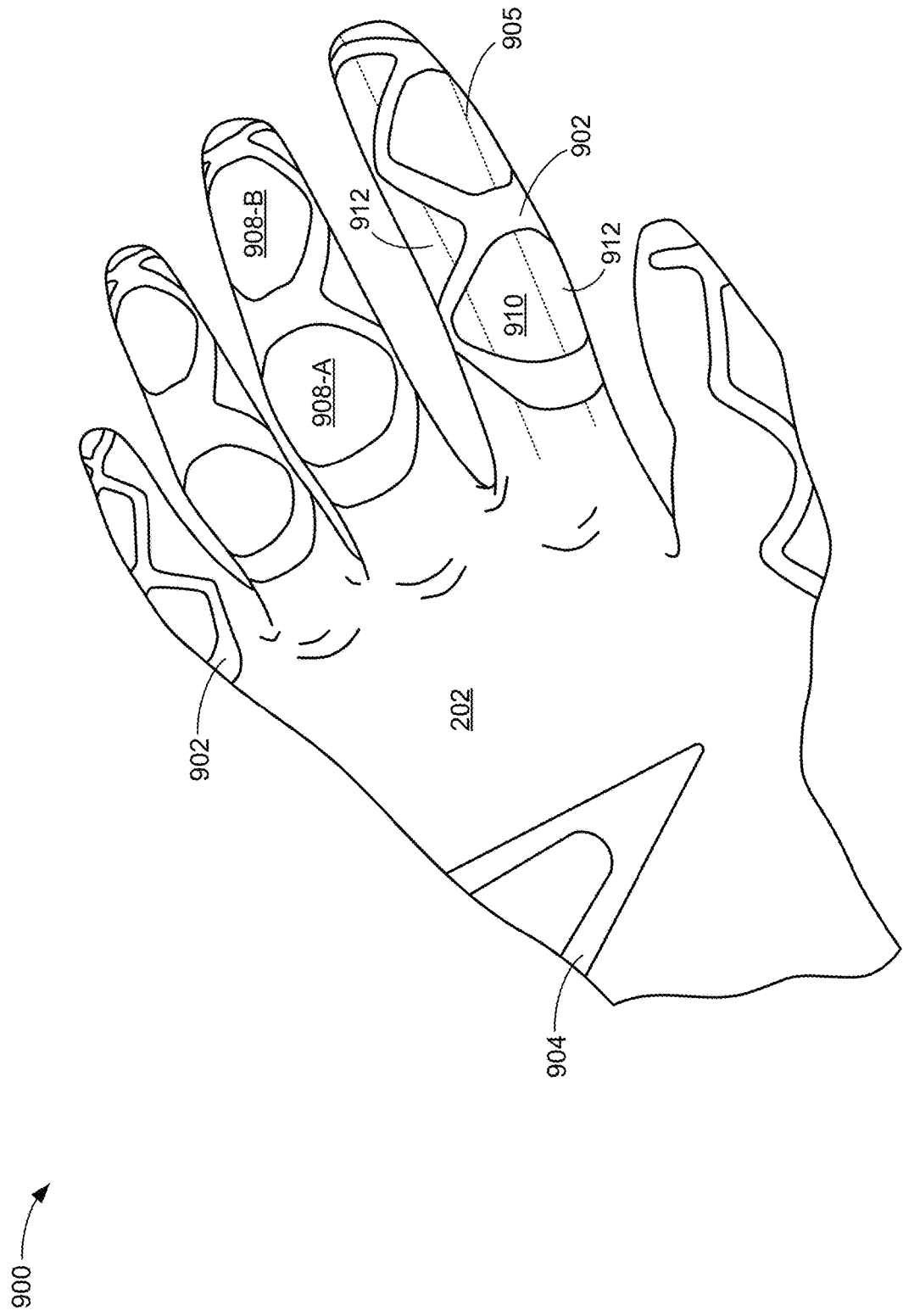
FIGS. 9A through 9C show various views of a passive grounding assembly in accordance with some embodiments.
Figure 9B:
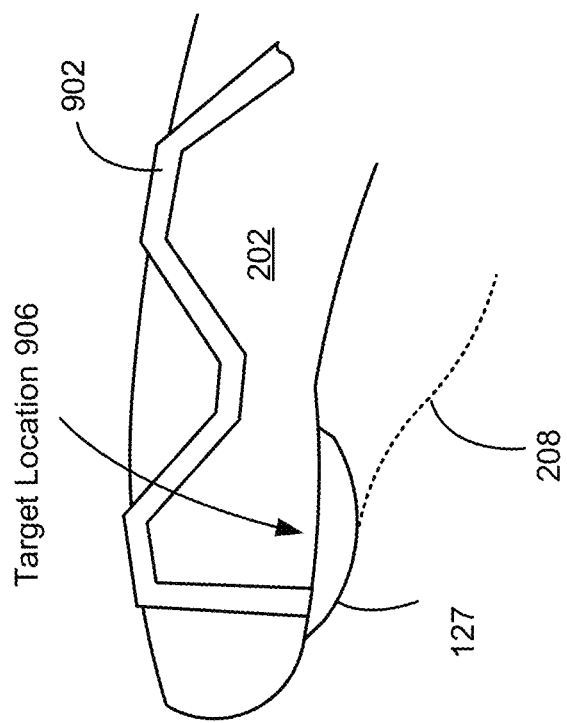
Figure 9C:
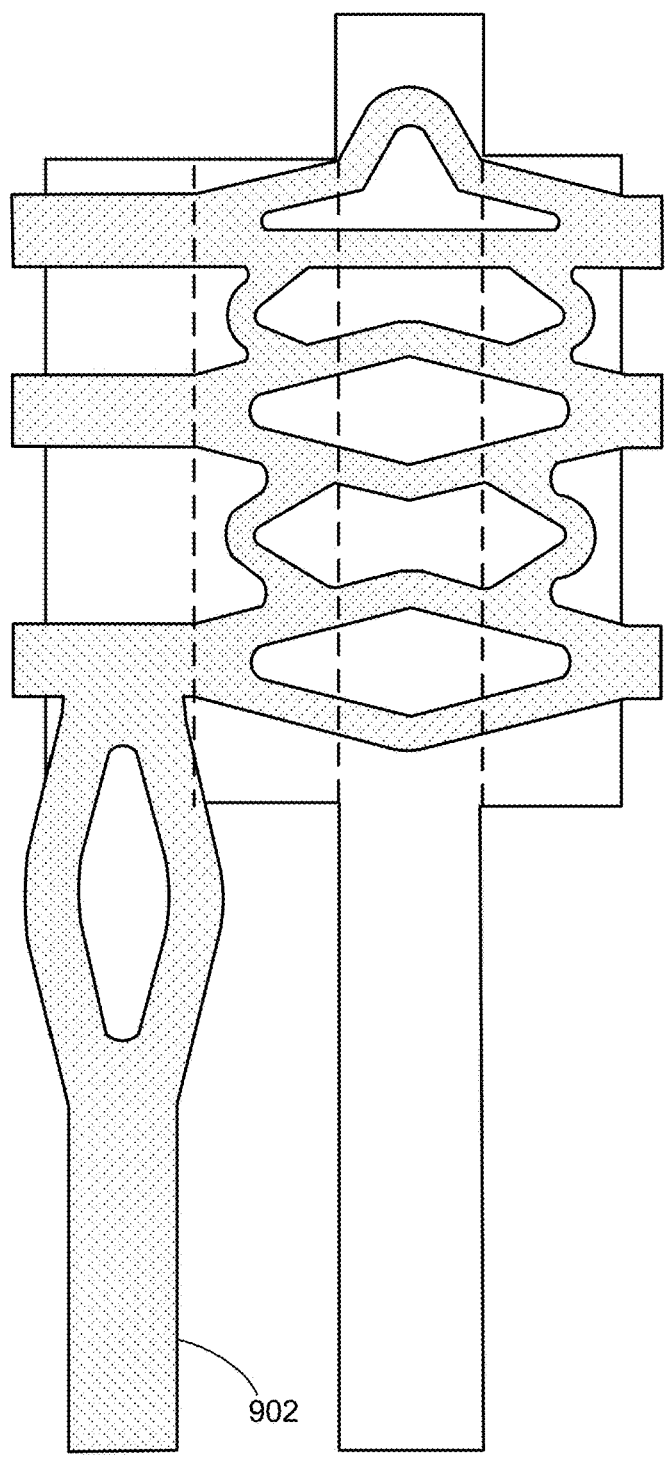

FIGS. 9A-9C show various views of a grounding assembly 900 that uses passive grounding techniques to secure user-feedback elements 124 to a user's body. The grounding assembly 900 is also designed so that the wearable structure 202 snuggly fits the user's body while not imparting unwanted encumbrances onto the user. It is noted that the grounding assembly 900 may be combined with any of the active grounding embodiments discussed above. In other words, the active grounding techniques discussed herein can be added to the grounding assembly 900 to further secure the wearable structure 202 and/or user-feedback elements 124 to a user's body. Also, in the illustrated embodiment, the grounding assembly 900 is designed for a human hand. However, in some embodiments, the grounding assembly 900 is designed for other parts of the body (e.g., wrist, forearm, foot, lower leg, etc.).

As shown, the grounding assembly 900 includes a wearable structure 202 configured to be worn by a user. The wearable structure 202 is made from a stretchable fabric/material with anisotropic elastic properties. In other words, different portions of the wearable structure 202 can have different degrees of elasticity in different directions. For example, (i) a greatest degree of elasticity in a first portion of the wearable structure 202 (e.g., dorsal portion) may be in a first direction (e.g., longitudinal) and (ii) a greatest degree of elasticity in a second portion of the wearable structure 202 (e.g., a palmar portion) may be in a second direction (e.g., lateral), or vice versa. It is noted the wearable structure 202 is composed of fibers (e.g., polymer fibers), and the elastic properties of the wearable structure 202 are based on a directional layout of the fibers (e.g., much like fibers in a carbon-fiber reinforced polymer dictate a strength in certain directions). Accordingly, a given portion of the wearable structure 202 can have numerous degrees of elasticity in numerous different directions.

At bottom, the anisotropic elastic properties of the wearable structure 202 allow the grounding assembly 900 to account for known movements of the user's hand, such that the wearable structure 202's elasticity can be designed so that the wearable structure 202 maintains a desired fit when the user moves his or her hand (e.g., makes a fist). For example, the wearable structure 202 may be designed so that certain portions of the wearable structure 202 stretch more to accommodate certain movements of the user's hand while other portions of the wearable structure 202 stretch less in to response to certain movements of the user's hand. Aside from fit, the wearable structure 202's elasticity is also designed so that user-feedback elements 124 coupled to the wearable structure 202 maintain their desired positions and orientations with respect to the user's body in response to various movements of the user's hand.

To further assist with maintaining the desired fit, the grounding assembly 900 also includes a coating 902 coupled to the wearable structure 202. In the illustrated example, the coating 902 is predominantly coupled to the dorsal side of the wearable structure 202. However, in other embodiments, the coating 902 may be coupled to other portions of the wearable structure 202, depending on the type of fit desired. The coating 902 may be a polymer material, such a thermoplastic polyurethane or the like. Like the elastic properties of the wearable structure 202, the coating 902 is designed to account for known movements of the user's hand so that certain portions of the wearable structure 202 stretch more to accommodate certain movements of the user's hand while other portions of the wearable structure 202 stretch less in to response to certain movements of the user's hand.

In particular, the coating 902 is added to the wearable structure 202 to limit stretch of the wearable structure 202 at one or more target locations (e.g., various locations along the palmar side of the wearable structure 202). To accomplish this, the coating 902 has a predefined geometry (e.g., web-like geometry shown in FIG. 9A) that is designed to limit stretch (i.e., constrain elongation) of the wearable structure 202 at the one or more target locations. As one example, without the coating 902, lateral sides of the wearable structure 202 along a user's finger tend to bow when the user makes a fist. As such, the predefined geometry of the coating 902 (along with mechanical properties of the coating 902, such as elasticity) is used to limit said bowing of the wearable structure 202. In another example, without the coating 902, the palmar side of the wearable structure 202 along a user's finger tends to be loose, especially when the user curls his or her finger. The predefined geometry of the coating 902 is again used tighten the palmar side of the wearable structure 202 (e.g., at the one or more target locations).

To limit unwanted encumbrances imposed on the user, the predefined geometry of the coating 902 defines one or more openings (i.e., relief areas) for the user's joints. For example, as shown in FIG. 9A, the coating 902 is not covering the user's joints 908-A, 908-B. In this way, the user can freely bend his or her fingers without the added strain imposed by the coating 902 on other portions of the hand. As for the wearable structure 202, a greatest degree of elasticity in these portions of the wearable structure 202 may be along a length of the finger (i.e., longitudinal) so that the finger joints 908-A, 908-B are unencumbered.

In some embodiments, the grounding assembly 900 includes another coating 904 coupled to the back side of the user's hand. The other coating 904 is used to limit bowing/bunching of the wearable structure 202 at the user's palm (e.g., when the user makes a fist, or otherwise moves his or her hand from a flat/planar state).

In some embodiments, an elasticity of the coating 902 (and the coating 904) is based on one or more of the following: (i) a number of deposited layers that compose the coating 902, (ii) a geometry of the coating 902 (e.g., different web-like geometries are possible), (iii) a thickness of the coating 902, (iv) a width of the coating 902, and (v) material properties of the coating 902 (e.g., various different TPUs can be used for the coating 902). In some embodiments, to tailor the elasticity of the coating 902, at least a portion of the coating 902 includes a plurality of layers, whereby a first layer in the plurality of layers is a first material (e.g., a first type of TPU) and a second layer in the plurality of layers is a second material (e.g., a second type of TPU) different from the first material.

While not shown in FIG. 9A, the wearable structure 202 may be composed of a plurality of sections/portions. As one example, FIG. 9A shows two sections of the wearable structure 202 that form the index finger portion of the wearable structure 202. As shown, a first section 910 is positioned along the dorsal side of the index finger and a second section 912 wraps around the palmar side of the index finger. Accordingly, because two distinct sections 910, 912 of the wearable structure 202 form the index finger portion of the wearable structure 202, this portion of the wearable structure 202 can have distinct elastic properties. For example, the first section 910 may have a greatest degree of elasticity in a first direction (e.g., longitudinal), which is based on movement of the dorsal side of the index finger, while the second section 912 may have a greatest degree of elasticity in a second direction (e.g., lateral), which is based on movement of the palmar side of the index finger.

As also shown in FIG. 9A, the first and second sections 910, 912 are connected to each other by a seam 905 (e.g., the first and section sections are sewn together). Notably, placement of the coating 902 on the wearable structure 202 is decoupled from (i.e., not dependent on) a location of the seam 905. Because the coating 902 is in no way dependent on the seam 905, the coating 902 can have any number of designs. In some embodiments, the seam 905 follows a gunn pattern or a fourchette pattern (or some other stitch pattern).

FIG. 9B shows a side view of the grounding assembly 900 (e.g., a side view of the user's index finger). As shown, the coating 902 may extend from the dorsal side of the wearable structure 202 to the palmar side of the wearable structure 202. In the illustrated embodiment, an actuator 127 is coupled to the palmar side of the wearable structure 202 at a target location 906. Accordingly, the predefined geometry of the coating 902 is designed to limit movement of the actuator 127 at the target location.

FIG. 9C shows another example of the coating 902 before the coating 902 is secured to the wearable structure 202. Notably, a design of the coating 902 makes use of lines of none extension (LONE), in this case LONE of a human finger, to reduce encumbrances while providing grounding.

The examples and embodiments detailed above are non-limiting and any number of combinations of grounding assemblies 122 are possible using the example structures described above. Indeed, an example assembly may incorporate one or more of the active grounding assemblies with the passive grounding assembly. In another example, an example wearable device may include multiple embodiments of the active grounding assemblies detailed above.

Embodiments of this disclosure may include or be implemented in conjunction with various types of artificial-reality systems. Artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation of one or more of these systems. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems are designed to work without near-eye displays (NEDs), an example of which is the artificial-reality system 1000 in FIG. 10. Other artificial-reality systems include an NED, which provides visibility into the real world (e.g., the augmented-reality (AR) system 1100 in FIG. 11) or that visually immerses a user in an artificial reality (e.g., the virtual-reality (VR) system 1200 in FIG. 12). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., wearable device 120), devices worn by one or more other users, and/or any other suitable external system.

Figure 10:
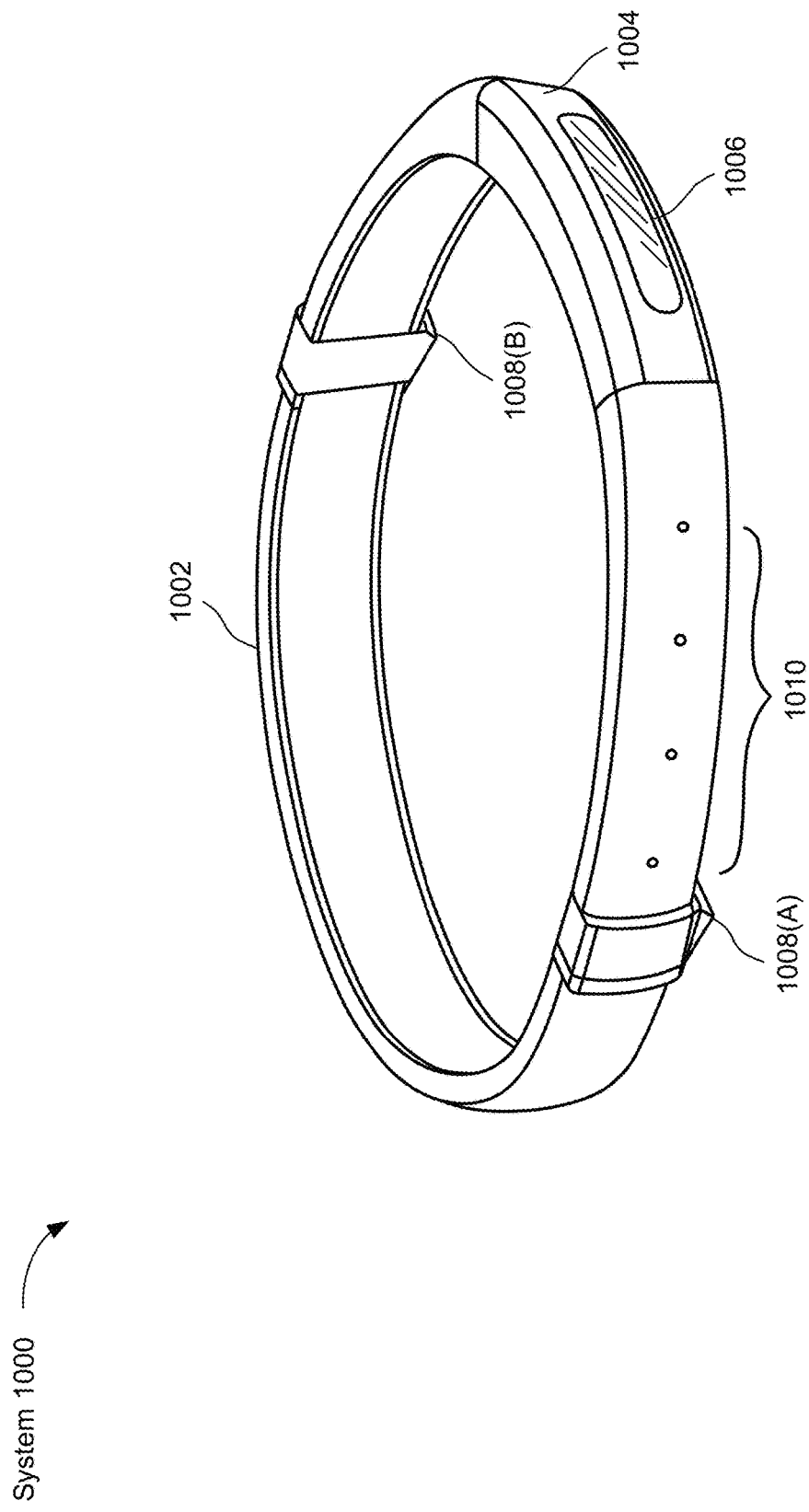
FIG. 10 shows an embodiment of an artificial-reality device.
Figure 11:
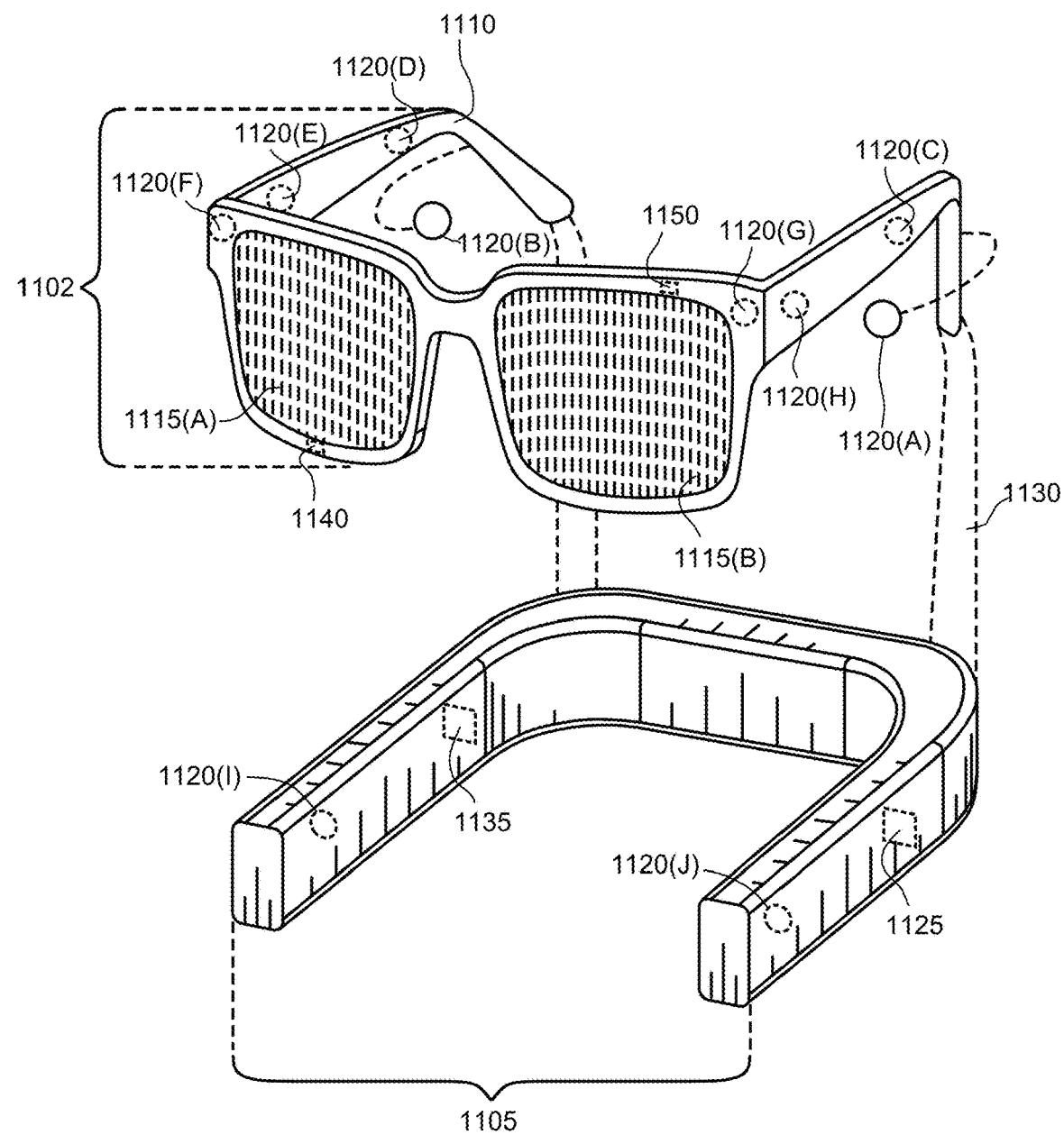
FIG. 11 shows an embodiment of an augmented-reality headset and a corresponding neckband.
Figure 12:
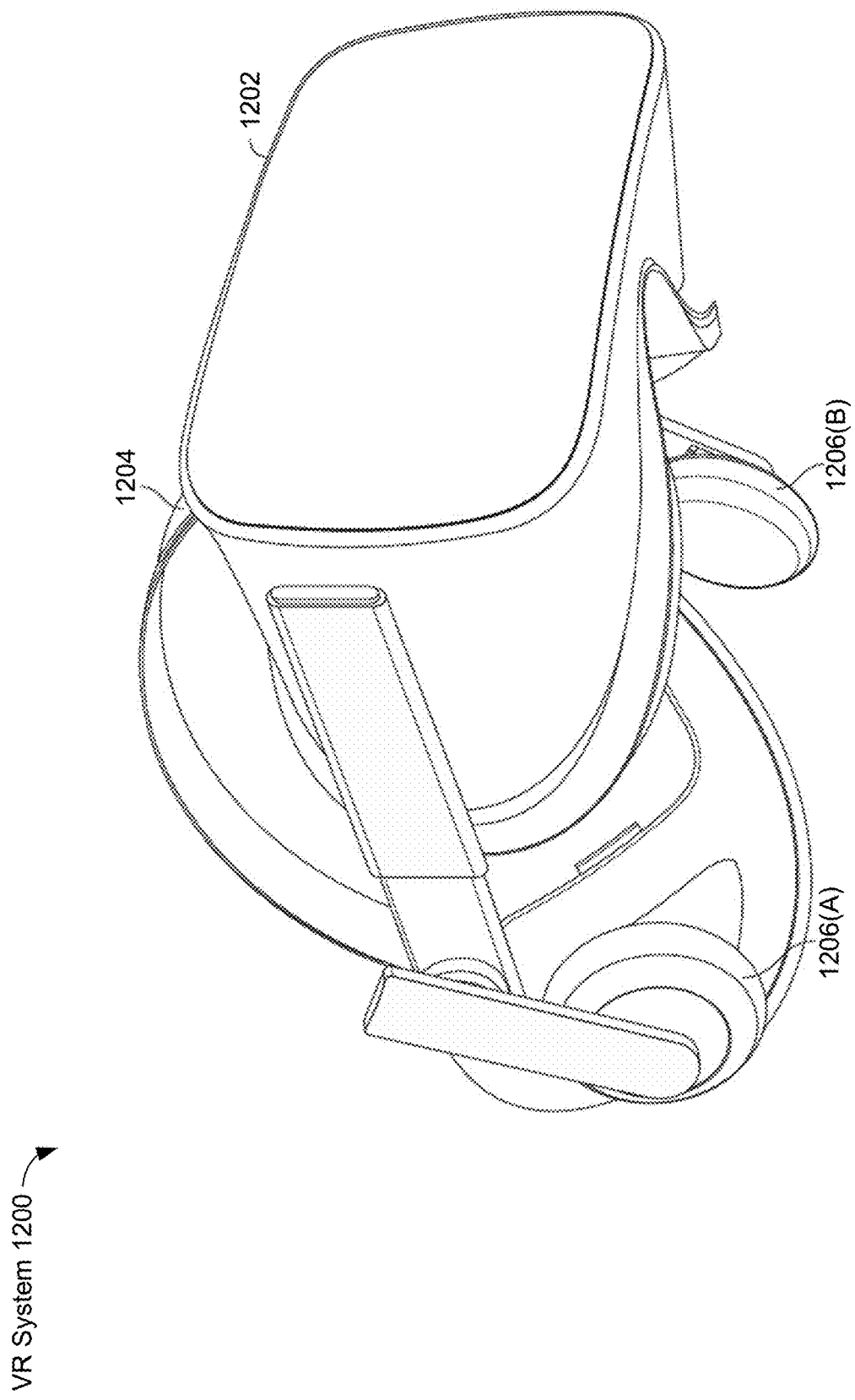
FIG. 12 shows an embodiment of a virtual-reality headset.

FIGS. 10-12 provide additional examples of the devices used in a system 100. The artificial-reality system 1000 in FIG. 10 generally represents a wearable device dimensioned to fit about a body part of a user. The artificial-reality system 1000 may include the functionality of a wearable device, and may include functions not described above. As shown, the artificial-reality system 1000 includes a frame 1002 (e.g., a band or wearable structure) and a camera assembly 1004, which is coupled to the frame 1002 and configured to gather information about a local environment by observing the local environment (and may include a display 1006 that displays a user interface). In some embodiments, the artificial-reality system 1000 includes output transducers 1008(A) and 1008(B) and input transducers 1010. The output transducers 1008(A) and 1008(B) may provide audio feedback, haptic feedback, and/or content to a user, and the input audio transducers may capture audio (or other signals/ waves) in a user's environment.

Thus, the artificial-reality system 1000 does not include a near-eye display (NED) positioned in front of a user's eyes. Artificial-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the artificial-reality system 1000 may not include an NED, the artificial-reality system 1000 may include other types of screens or visual feedback devices (e.g., a display screen integrated into a side of the frame 1002).

The embodiments discussed in this disclosure may also be implemented in artificial-reality systems that include one or more NEDs. For example, as shown in FIG. 11, the AR system 1100 may include an eyewear device 1102 with a frame 1110 configured to hold a left display device 1115(B) and a right display device 1115(A) in front of a user's eyes. The display devices 1115(A) and 1115(B) may act together or independently to present an image or series of images to a user. While the AR system 1100 includes two displays, embodiments of this disclosure may be implemented in AR systems with a single NED or more than two NEDs.

In some embodiments, the AR system 1100 includes one or more sensors, such as the sensors 1140 and 1150 (examples of sensors 114, FIG. 1). The sensors 1140 and 1150 may generate measurement signals in response to motion of the AR system 1100 and may be located on substantially any portion of the frame 1110. Each sensor may be a position sensor, an inertial measurement unit (IMU), a depth camera assembly, or any combination thereof. The AR system 1100 may or may not include sensors or may include more than one sensor. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 1100 may also include a microphone array with a plurality of acoustic sensors 1120(A)-1120(J), referred to collectively as the acoustic sensors 1120. The acoustic sensors 1120 may be transducers that detect air pressure variations induced by sound waves. Each acoustic sensor 1120 may be configured to detect sound and convert the detected sound into an electronic format (e.g., an analog or digital format). The microphone array in FIG. 11 may include, for example, ten acoustic sensors: 1120(A) and 1120(B), which may be designed to be placed inside a corresponding ear of the user, acoustic sensors 1120(C), 1120(D), 1120(E), 1120(F), 1120(G), and 1120(H), which may be positioned at various locations on the frame 1110, and/or acoustic sensors 1120(I) and 1120(J), which may be positioned on a corresponding neckband 1105. In some embodiments, the neckband 1105 is an example of a computer system.

The configuration of the acoustic sensors 1120 of the microphone array may vary. While the AR system 1100 is shown in FIG. 11 having ten acoustic sensors 1120, the number of acoustic sensors 1120 may be greater or less than ten. In some embodiments, using more acoustic sensors 1120 may increase the amount of audio information collected and/or the sensitivity and accuracy of the audio information. In contrast, using a lower number of acoustic sensors 1120 may decrease the computing power required by a controller 1125 to process the collected audio information. In addition, the position of each acoustic sensor 1120 of the microphone array may vary. For example, the position of an acoustic sensor 1120 may include a defined position on the user, a defined coordinate on the frame 1110, an orientation associated with each acoustic sensor, or some combination thereof.

The acoustic sensors 1120(A) and 1120(B) may be positioned on different parts of the user's ear, such as behind the pinna or within the auricle or fossa. In some embodiments, there are additional acoustic sensors on or surrounding the ear in addition to acoustic sensors 1120 inside the ear canal. Having an acoustic sensor positioned next to an ear canal of a user may enable the microphone array to collect information on how sounds arrive at the ear canal. By positioning at least two of the acoustic sensors 1120 on either side of a user's head (e.g., as binaural microphones), the AR device 1100 may simulate binaural hearing and capture a 3D stereo sound field around a user's head. In some embodiments, the acoustic sensors 1120(A) and 1120(B) may be connected to the AR system 1100 via a wired connection, and in other embodiments, the acoustic sensors 1120(A) and 1120(B) may be connected to the AR system 1100 via a wireless connection (e.g., a Bluetooth connection). In still other embodiments, the acoustic sensors 1120(A) and 1120(B) may not be used at all in conjunction with the AR system 1100.

The acoustic sensors 1120 on the frame 1110 may be positioned along the length of the temples, across the bridge, above or below the display devices 1115(A) and 1115(B), or some combination thereof. The acoustic sensors 1120 may be oriented such that the microphone array is able to detect sounds in a wide range of directions surrounding the user wearing AR system 1100. In some embodiments, an optimization process may be performed during manufacturing of the AR system 1100 to determine relative positioning of each acoustic sensor 1120 in the microphone array.

The AR system 1100 may further include or be connected to an external device (e.g., a paired device), such as a neckband 1105. As shown, the neckband 1105 may be coupled to the eyewear device 1102 via one or more connectors 1130. The connectors 1130 may be wired or wireless connectors and may include electrical and/or non-electrical (e.g., structural) components. In some cases, the eyewear device 1102 and the neckband 1105 operate independently without any wired or wireless connection between them. While FIG. 11 illustrates the components of the eyewear device 1102 and the neckband 1105 in example locations on the eyewear device 1102 and the neckband 1105, the components may be located elsewhere and/or distributed differently on the eyewear device 1102 and/or on the neckband 1105. In some embodiments, the components of the eyewear device 1102 and the neckband 1105 may be located on one or more additional peripheral devices paired with the eyewear device 1102, the neckband 1105, or some combination thereof. Furthermore, the neckband 1105 generally represents any type or form of paired device. Thus, the following discussion of neckband 1105 may also apply to various other paired devices, such as smart watches, smart phones, wrist bands, other wearable devices, hand-held controllers, tablet computers, or laptop computers.

Pairing external devices, such as a neckband 1105, with AR eyewear devices may enable the eyewear devices to achieve the form factor of a pair of glasses while still providing sufficient battery and computational power for expanded capabilities. Some or all of the battery power, computational resources, and/or additional features of the AR system 1100 may be provided by a paired device or shared between a paired device and an eyewear device, thus reducing the weight, heat profile, and form factor of the eyewear device overall while still retaining desired functionality. For example, the neckband 1105 may allow components that would otherwise be included on an eyewear device to be included in the neckband 1105 because users may tolerate a heavier weight load on their shoulders than they would tolerate on their heads. The neckband 1105 may also have a larger surface area over which to diffuse and disperse heat to the ambient environment. Thus, the neckband 1105 may allow for greater battery and computational capacity than might otherwise have been possible on a stand-alone eyewear device. Because weight carried in the neckband 1105 may be less invasive to a user than weight carried in the eyewear device 1102, a user may tolerate wearing a lighter eyewear device and carrying or wearing the paired device for greater lengths of time than the user would tolerate wearing a heavy standalone eyewear device, thereby enabling an artificial-reality environment to be incorporated more fully into a user's day-to-day activities.

The neckband 1105 may be communicatively coupled with the eyewear device 1102 and/or to other devices (e.g., a wearable device). The other devices may provide certain functions (e.g., tracking, localizing, depth mapping, processing, storage, etc.) to the AR system 1100. In the embodiment of FIG. 11, the neckband 1105 includes two acoustic sensors 1120(I) and 1120(J), which are part of the microphone array (or potentially form their own microphone subarray). The neckband 1105 includes a controller 1125 and a power source 1135.

The acoustic sensors 1120(I) and 1120(J) of the neckband 1105 may be configured to detect sound and convert the detected sound into an electronic format (analog or digital). In the embodiment of FIG. 11, the acoustic sensors 1120(I) and 1120(J) are positioned on the neckband 1105, thereby increasing the distance between neckband acoustic sensors 1120(I) and 1120(J) and the other acoustic sensors 1120 positioned on the eyewear device 1102. In some cases, increasing the distance between the acoustic sensors 1120 of the microphone array improves the accuracy of beamforming performed via the microphone array. For example, if a sound is detected by the acoustic sensors 1120(C) and 1120(D) and the distance between acoustic sensors 1120(C) and 1120(D) is greater than, for example, the distance between the acoustic sensors 1120(D) and 1120(E), the determined source location of the detected sound may be more accurate than if the sound had been detected by the acoustic sensors 1120(D) and 1120(E).

The controller 1125 of the neckband 1105 may process information generated by the sensors on the neckband 1105 and/or the AR system 1100. For example, the controller 1125 may process information from the microphone array, which describes sounds detected by the microphone array. For each detected sound, the controller 1125 may perform a direction of arrival (DOA) estimation to estimate a direction from which the detected sound arrived at the microphone array. As the microphone array detects sounds, the controller 1125 may populate an audio data set with the information. In embodiments in which the AR system 1100 includes an IMU, the controller 1125 may compute all inertial and spatial calculations from the IMU located on the eyewear device 1102. The connector 1130 may convey information between the AR system 1100 and the neckband 1105 and between the AR system 1100 and the controller 1125. The information may be in the form of optical data, electrical data, wireless data, or any other transmittable data form. Moving the processing of information generated by the AR system 1100 to the neckband 1105 may reduce weight and heat in the eyewear device 1102, making it more comfortable to a user.

The power source 1135 in the neckband 1105 may provide power to the eyewear device 1102 and/or to the neckband 1105. The power source 1135 may include, without limitation, lithium-ion batteries, lithium-polymer batteries, primary lithium batteries, alkaline batteries, or any other form of power storage. In some cases, the power source 1135 may be a wired power source. Including the power source 1135 on the neckband 1105 instead of on the eyewear device 1102 may help better distribute the weight and heat generated by the power source 1135.

As noted, some artificial-reality systems may, instead of blending an artificial-reality with actual reality, substantially replace one or more of a user's sensory perceptions of the real world with a virtual experience. One example of this type of system is a head-worn display system, such as the VR system 1200 in FIG. 12, which mostly or completely covers a user's field of view. The VR system 1200 may include a front rigid body 1202 and a band 1204 shaped to fit around a user's head. In some embodiments, the VR system 1200 includes output audio transducers 1206(A) and 1206(B), as shown in FIG. 12. Furthermore, while not shown in FIG. 12, the front rigid body 1202 may include one or more electronic elements, including one or more electronic displays, one or more IMUs, one or more tracking emitters or detectors, and/or any other suitable device or system for creating an artificial-reality experience.

Artificial-reality systems may include a variety of types of visual feedback mechanisms. For example, display devices in the AR system 1100 and/or the VR system 1200 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, or adjustable liquid lenses) through which a user may view a display screen. These systems and mechanisms are discussed in further detail above with reference to FIG. 1.

In addition to or instead of using display screens, some artificial-reality systems may include one or more projection systems. For example, display devices in the AR system 1100 and/or the VR system 1200 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the artificial-reality system 1000, the AR system 1100, and/or the VR system 1200 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 10 and 12, the output audio transducers 1008(A), 1008(B), 1206(A), and 1206(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 1010 may include condenser microphones, dynamic microphones, ribbon microphones, and/or any other type or form of input transducer. In some embodiments, a single transducer may be used for both audio input and audio output.

The artificial-reality systems shown in FIGS. 10-12 may include tactile (i.e., haptic) feedback systems, which may be incorporated into headwear, gloves, body suits, handheld controllers, environmental devices (e.g., chairs or floormats), and/or any other type of device or system, such as the wearable devices 120 discussed herein. Additionally, in some embodiments, the haptic feedback systems may be incorporated with the artificial-reality systems (e.g., systems 1000, 1100, and 1200 may include the wearable device 120 shown in FIG. 1). Haptic feedback systems may provide various types of cutaneous feedback, including vibration, force, traction, shear, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic-feedback systems may be implemented independently of other artificial-reality devices, within other artificial reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular, or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 1000, 1100, and 1200) may incorporate any or all of these types of sensors to perform SLAM operations, such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's artificial-reality device on demand.

When a user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a Direction of Arrival ("DOA") analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial-reality device may provide an alignment and orientation guide, which the user may follow to customize the sound signal presented to the user based on a personal HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, infrared radiation (IR) sensors, heat sensors, motion sensors, global positioning system (GPS) receivers, or in some cases, sensors that detect a user's eye movements. For example, an artificial-reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (e.g., using any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A wearable device comprising:
a wearable structure configured to be worn by a user; and
a grounding assembly, coupled to the wearable structure, the grounding assembly including:
 (i) an inflatable bladder that is (a) coupled to a first portion of the wearable structure, (b) fluidically coupled to a source via a conduit, and (c) configured to receive a fluid from the source via the conduit; and
 (ii) a cord, distinct from the conduit, that is (a) coupled to a second portion of the wearable structure and the inflatable bladder and (b) configured to tighten around a portion of the user's body according to and in proportion with a fluid pressure inside the inflatable bladder, wherein a first portion of the cord is configured to wrap partially around the inflatable bladder while a second portion of the cord is configured to wrap around the portion of the user's body.

2. The wearable device of claim 1, further comprising:
at least one actuator, coupled to the wearable structure, the at least one actuator configured to impart a haptic stimulation to the user at a target location,
wherein the cord is further configured to secure the at least one actuator to the user at the target location when tightened around the portion of the user's body.

3. The wearable device of claim 1, wherein:
at least a portion of the cord is wrapped, at least partially, around the inflatable bladder; and
the inflatable bladder is configured to pull the cord in a direction when the fluid pressure inside the inflatable bladder satisfies a threshold pressure, thereby causing the cord to tighten around the portion of the user's body.

4. The wearable device of claim 1, wherein the cord is configured to be wound around the portion of the user's body in a predefined pattern.

5. The wearable device of claim 4, wherein:
the portion of the user's body includes one or more joints; and
the predefined pattern of the cord is designed to not encumber the one or more joints of the portion of the user's body.

6. The wearable device of claim 5, wherein:
the grounding assembly further includes a plurality of brackets coupled to the wearable structure; and
the cord is fed through the plurality of brackets to form the predefined pattern.

7. The wearable device of claim 6, wherein:
the portion of the user's body is a finger of the user;
one or more first brackets of the plurality of brackets are positioned on a palmar side of the wearable structure; and
one or more second brackets of the plurality of brackets are positioned on a dorsal side of the wearable structure.

8. The wearable device of claim 1, wherein the second portion of the wearable structure is configured to receive the portion of the user's body.

9. The wearable device of claim 1, wherein:
the source is in communication with a computing device; and
the source is configured to change the fluid pressure in the inflatable bladder in response to receiving one or more signals from the computing device.

10. The wearable device of claim 9, wherein:
the computing device is in communication with a head-mounted display that presents content to the user, the head-mounted display including an electronic display; and
the one or more signals correspond to content displayed on the electronic display.

11. The wearable device of claim 1, wherein:
the source is a pneumatic device; and
the inflatable bladder is pneumatically coupled to the pneumatic device.

* * * * *